United States Patent
Konishi et al.

(10) Patent No.: US 8,259,724 B2
(45) Date of Patent: Sep. 4, 2012

(54) DATA TRANSMITTING APPARATUS AND DATA RETRANSMITTING METHOD

(75) Inventors: Kazunobu Konishi, Osaka (JP); Eiichi Muramoto, Kanagawa (JP); Takahiro Yoneda, Tokyo (JP); Ichiro Takei, Tokyo (JP); Masashi Kobayashi, Tokyo (JP); Taisuke Matsumoto, Sunnyvale, CA (US)

(73) Assignee: Panasonic Corporation, Osaka (JP)

( * ) Notice: Subject to any disclaimer, the term of this patent is extended or adjusted under 35 U.S.C. 154(b) by 267 days.

(21) Appl. No.: 12/668,271

(22) PCT Filed: Jul. 11, 2008

(86) PCT No.: PCT/JP2008/001873
§ 371 (c)(1),
(2), (4) Date: Apr. 8, 2010

(87) PCT Pub. No.: WO2009/008181
PCT Pub. Date: Jan. 15, 2009

(65) Prior Publication Data
US 2010/0183012 A1    Jul. 22, 2010

(30) Foreign Application Priority Data
Jul. 11, 2007  (JP) ................................. 2007-182669

(51) Int. Cl.
*H04L 12/28* (2006.01)
*H04L 12/56* (2006.01)

(52) U.S. Cl. .............. 370/392; 370/395.71; 370/395.72; 370/428

(58) Field of Classification Search ........................ None
See application file for complete search history.

(56) References Cited

U.S. PATENT DOCUMENTS 6,918,077 B2 * 7/2005 Fukushima et al. .......... 714/748
(Continued)

FOREIGN PATENT DOCUMENTS
JP         2003-209576        7/2003

OTHER PUBLICATIONS

Y. Imai, M. Shin and Y. Kim, "XCAST6: eXplicit Multicast on IPv6", IEEE / IPSJ SAINT2003 Workshop 4, IPv6 and Applications, Orlando, Jan. 2003.
Hiroshi Hayakawa et al., "Doho Ki Henkagata Kakunin Saiso Hoshiki-Ippangata, Kyodaikan Keiro Bunsan Kakunin Saisogata", IEICE technical report, pp. 1-4, NS2006-70, Sep. 7, 2006.

(Continued)

*Primary Examiner* — Ayaz Sheikh
*Assistant Examiner* — Blanche Wong
(74) *Attorney, Agent, or Firm* — Greenblum & Bernstein, P.L.C.

(57) ABSTRACT

A data transmitting apparatus makes it possible to send out a retransmitting packet at early timing even when a delivery tree structure is unclear. A transmitting terminal device including this data transmitting apparatus is includes a retransmitting request receiver that receives a data retransmitting request, a receiving terminal device relevancy updater that stores a past history of the number of reception of a retransmitting request transmitted from a first data receiving device and a past history of the number of reception of a retransmitting request sent from the other data receiving devices, wherein the subject of the retransmitting request sent by the other data receiving devices is the same as the object of the retransmitting request sent by the first data receiving device, and a retransmitting destination selector that estimates a delivery tree from the history stored by the receiving terminal device relevancy updater when the retransmitting destination selector receives the retransmitting request from the first data receiving device and selects, another data receiving device positioned downstream of the first data receiving device in the estimated delivery tree.

12 Claims, 29 Drawing Sheets

U.S. PATENT DOCUMENTS

| | | | |
|---|---|---|---|
| 7,124,333 B2 * | 10/2006 | Fukushima et al. | 714/701 |
| 7,457,257 B2 * | 11/2008 | Tang et al. | 370/256 |
| 7,733,868 B2 * | 6/2010 | Van Zijst | 370/394 |
| 7,778,273 B2 * | 8/2010 | Luo et al. | 370/465 |
| 2009/0193101 A1 | 7/2009 | Munetsugu et al. | |

OTHER PUBLICATIONS

Satoshi Morita et al., "Ko Shinrai Multicast ni Okeru Saiso Ki Kochiku Hoshiki no Kairyo", pp. 55-60, Information Processing Society of Japan Kenkyu Hokoku, 2002-DPS-108-10, Jun. 7, 2002.

* cited by examiner

| Receiving Terminal | Retransmitted Sequence Number | Retransmission Request Sequence Number | Total Number of Retransmission Request Receptions | Number of Retransmission Request Receptions | | | | |
|---|---|---|---|---|---|---|---|---|
| | | | | A | B | C | D | E |
| A | 3 | 3 | 5 | A (-) | B (5) | C (5) | D (5) | E (5) |
| B | 3,10 | 3,10 | 30 | A (5) | B (-) | C (5) | D (29) | E (30) |
| C | 3,7 | 3,7 | 15 | A (5) | B (5) | C (-) | D (5) | E (5) |
| D | 3 | 3 | 29 | A (5) | B (29) | C (5) | D (-) | E (29) |
| E | 3,10 | 3,10 | 30 | A (5) | B (30) | C (5) | D (29) | E (-) |

FIG.4

| RECEIVING TERMINAL | RETRANSMITTED SEQUENCE NUMBER | RETRANSMISSION REQUEST SEQUENCE NUMBER | TOTAL NUMBER OF RETRANSMISSION REQUEST RECEPTIONS | NUMBER OF RETRANSMISSION REQUEST RECEPTIONS | | | | |
|---|---|---|---|---|---|---|---|---|
| A | 3 | 3 | 5 | A (−) | B (5) | C (5) | D (5) | E (5) |
| B | 3,10 | 3,10 | 30 | A (5) | B (−) | C (5) | D (29) | E (30) |
| C | 3,7 | 3,7 | 15 | A (5) | B (5) | C (−) | D (5) | E (5) |
| D | 3 | 3,10 | 29 | A (5) | B (29) | C (5) | D (−) | E (29) |
| E | 3,10 | 3,10 | 30 | A (5) | B (30) | C (5) | D (29) | E (−) |

FIG.8

| RECEIVING TERMINAL | RETRANSMITTED SEQUENCE NUMBER | RETRANSMISSION REQUEST SEQUENCE NUMBER | TOTAL NUMBER OF RETRANSMISSION REQUEST RECEPTIONS | NUMBER OF RETRANSMISSION REQUEST RECEPTIONS | | | | |
|---|---|---|---|---|---|---|---|---|
| A | 3 | 3 | 5 | A (–) | B (5) | C (5) | D (5) | E (5) |
| B | 3,10 | 3,10 | 30 | A (5) | B (–) | C (5) | D (29) | E (30) |
| C | 3,7 | 3,7 | 15 | A (5) | B (5) | C (–) | D (5) | E (5) |
| D | 3 | 3,10 | 30 | A (5) | B (29) | C (5) | D (–) | E (29) |
| E | 3,10 | 3,10 | 30 | A (5) | B (30) | C (5) | D (29) | E (–) |

FIG.9

| RECEIVING TERMINAL | RETRANSMITTED SEQUENCE NUMBER | RETRANSMISSION REQUEST SEQUENCE NUMBER | TOTAL NUMBER OF RETRANSMISSION REQUEST RECEPTIONS | NUMBER OF RETRANSMISSION REQUEST RECEPTIONS ||||||
|---|---|---|---|---|---|---|---|---|
| | | | | A | B | C | D | E |
| A | 3 | 3 | 5 | A (—) | B (5) | C (5) | D (5) | E (5) |
| B | 3,10 | 3,10 | 30 | A (5) | B (—) | C (5) | D (30) | E (30) |
| C | 3,7 | 3,7 | 15 | A (5) | B (5) | C (—) | D (5) | E (5) |
| D | 3 | 3,10 | 30 | A (5) | B (30) | C (5) | D (—) | E (30) |
| E | 3,10 | 3,10 | 30 | A (5) | B (30) | C (5) | D (30) | E (—) |

| Receiving Terminal | Retransmitted Sequence Number | Retransmission Request Sequence Number | Total Number of Retransmission Request Receptions | Number of Retransmission Request Receptions | | | | |
|---|---|---|---|---|---|---|---|---|
| 811 | 812 | 813 | 814 | 815 | | | | |
| | | | | A | B | C | D | E |
| A | 3 | 3 | 5 | (–) | (5) | (5) | (5) | (5) |
| B | 3,10 | 3,10 | 30 | (5) | (–) | (5) | (30) | (30) |
| C | 3,7 | 3,7 | 15 | (5) | (5) | (–) | (5) | (5) |
| D | 3,10 | 3,10 | 30 | (5) | (30) | (5) | (–) | (30) |
| E | 3,10 | 3,10 | 30 | (5) | (30) | (5) | (30) | (–) |

810

830

| RECEIVING TERMINAL | PREVIOUS UPDATE TIME [sec] |
|---|---|
| A | 1329.2032 |
| B | 1438.997 |
| C | 1430.5001 |
| D | 1439.0040 |
| E | 1439.0010 |

FIG.14

| RECEIVING TERMINAL | RETRANSMITTED SEQUENCE NUMBER | RETRANSMISSION REQUEST SEQUENCE NUMBER | TOTAL NUMBER OF RETRANSMISSION REQUEST RECEPTIONS | NUMBER OF RETRANSMISSION REQUEST RECEPTIONS | | | | |
|---|---|---|---|---|---|---|---|---|
| A | 3 | 3 | 5 | A (−) | B (5) | C (5) | D (5) | E (5) |
| B | 3,10 | 3,10 | 30 | A (5) | B (−) | C (5) | D (25) | E (30) |
| C | 3,7 | 3,7 | 15 | A (5) | B (5) | C (−) | D (5) | E (5) |
| D | 3 | 3,10 | 29 | A (5) | B (25) | C (5) | D (−) | E (22) |
| E | 3,10 | 3,10 | 30 | A (5) | B (30) | C (5) | D (24) | E (−) |

FIG.16

| Receiving Terminal (811) | Retransmitted Sequence Number (812) | Retransmission Request Sequence Number (813) | Total Number of Retransmission Request Receptions (814) | Number of Retransmission Request Receptions (815) | | | | |
|---|---|---|---|---|---|---|---|---|
| | | | | A | B | C | D | E |
| A | 3 | 3 | 5 | A (–) | B (5) | C (5) | D (5) | E (5) |
| B | 3,10 | 3,10 | 7.8 | A (1.3) | B (–) | C (1.3) | D (7.5) | E (7.8) |
| C | 3,7 | 3,7 | 15 | A (5) | B (5) | C (–) | D (5) | E (5) |
| D | 3 | 3,10 | 12.6 | A (2) | B (10) | C (2) | D (–) | E (8.8) |
| E | 3,10 | 3,10 | 30 | A (5) | B (30) | C (5) | D (24) | E (–) |

| Receiving Terminal (811) | Retransmitted Sequence Number (812) | Retransmission Request Sequence Number (813) | Total Number of Retransmission Request Receptions (814) | Number of Retransmission Request Receptions (815) | | | | |
|---|---|---|---|---|---|---|---|---|
| | | | | A | B | C | D | E |
| A | 3 | 3 | 5 | A (—) | B (5) | C (5) | D (5) | E (5) |
| B | 3,10 | 3,10 | 7.8 | A (1.3) | B (—) | C (1.3) | D (7.5) | E (7.8) |
| C | 3,7 | 3,7 | 15 | A (5) | B (5) | C (—) | D (5) | E (5) |
| D | 3 | 3,10 | 12.6 | A (2) | B (10) | C (2) | D (—) | E (8.8) |
| E | 3,10 | 3,10 | 10.2 | A (1.7) | B (10.2) | C (1.7) | D (9.16) | E (—) |

810

| RECEIVING TERMINAL | RETRANSMITTED SEQUENCE NUMBER | RETRANSMISSION REQUEST SEQUENCE NUMBER | TOTAL NUMBER OF RETRANSMISSION REQUEST RECEPTIONS | NUMBER OF RETRANSMISSION REQUEST RECEPTIONS | | | | |
|---|---|---|---|---|---|---|---|---|
| | | | | A | B | C | D | E |
| A | 3 | 3 | 0.7 | A (—) | B (0.7) | C (0.7) | D (0.7) | E (0.7) |
| B | 3,10 | 3,10 | 18.3 | A (0.8) | B (—) | C (0.9) | D (16.9) | E (18.4) |
| C | 3,7 | 3,7 | 0.8 | A (0.8) | B (0.1) | C (—) | D (0.7) | E (0.7) |
| D | 3 | 3,10 | 17 | A (0.8) | B (16.9) | C (0.7) | D (—) | E (18.6) |
| E | 3,10 | 3,10 | 19.6 | A (0.8) | B (18.0) | C (0.7) | D (16.7) | E (—) |

| RECEIVING TERMINAL (841) | PREVIOUS UPDATE TIME [sec] (842) | PAST HISTORY (i) (843 i) | PAST HISTORY (ii) (843 ii) | PAST HISTORY (iii) (843 iii) | NUMBER OF RETRANSMISSION REQUEST RECEPTIONS HISTORY (844) | | | | |
|---|---|---|---|---|---|---|---|---|---|
| A | 1329.2032 | 1 | 0 | 1 | A i (−)<br>A ii (−)<br>A iii (−) | B i (0)<br>B ii (0)<br>B iii (1) | C i (1)<br>C ii (0)<br>C iii (1) | D i (1)<br>D ii (0)<br>D iii (1) | E i (1)<br>E ii (0)<br>E iii (1) |
| B | 1439.1003 | 22 | 15 | 6 | A i (1)<br>A ii (0)<br>A iii (2) | B i (−)<br>B ii (−)<br>B iii (−) | C i (1)<br>C ii (1)<br>C iii (0) | D i (20)<br>D ii (15)<br>D iii (4) | E i (22)<br>E ii (15)<br>E iii (7) |
| C | 1430.5001 | 1 | 0 | 2 | A i (1)<br>A ii (0)<br>A iii (2) | B i (0)<br>B ii (0)<br>B iii (1) | C i (−)<br>C ii (−)<br>C iii (−) | D i (1)<br>D ii (0)<br>D iii (1) | E i (1)<br>E ii (0)<br>E iii (1) |
| D | 1439.0040 | 19 | 15 | 5 | A i (1)<br>A ii (0)<br>A iii (2) | B i (19)<br>B ii (15)<br>B iii (4) | C i (1)<br>C ii (0)<br>C iii (1) | D i (−)<br>D ii (−)<br>D iii (−) | E i (23)<br>E ii (12)<br>E iii (6) |
| E | 1439.1100 | 24 | 15 | 7 | A i (1)<br>A ii (0)<br>A iii (2) | B i (22)<br>B ii (14)<br>B iii (6) | C i (1)<br>C ii (0)<br>C iii (1) | D i (20)<br>D ii (14)<br>D iii (5) | E i (−)<br>E ii (−)<br>E iii (−) |

843 { 843 i, 843 ii, 843 iii }

| Receiving Terminal | Previous Update Time [sec] | Past History (i) | Past History (ii) | Past History (iii) | Number of Retransmission Request Receptions History | | | | |
|---|---|---|---|---|---|---|---|---|---|
| A | 1329.2032 | 1 | 0 | 1 | A i (−)<br>A ii (−)<br>A iii (−) | B i (1)<br>B ii (0)<br>B iii (1) | C i (1)<br>C ii (0)<br>C iii (1) | D i (1)<br>D ii (0)<br>D iii (1) | E i (1)<br>E ii (0)<br>E iii (1) |
| B | 1439.1003 | 22 | 15 | 6 | A i (1)<br>A ii (0)<br>A iii (2) | B i (−)<br>B ii (−)<br>B iii (−) | C i (1)<br>C ii (1)<br>C iii (0) | D i (21)<br>D ii (15)<br>D iii (4) | E i (22)<br>E ii (15)<br>E iii (7) |
| C | 1430.5001 | 1 | 0 | 2 | A i (1)<br>A ii (0)<br>A iii (2) | B i (0)<br>B ii (0)<br>B iii (1) | C i (−)<br>C ii (−)<br>C iii (−) | D i (1)<br>D ii (0)<br>D iii (1) | E i (1)<br>E ii (0)<br>E iii (1) |
| D | 1439.0040 | 20 | 15 | 5 | A i (1)<br>A ii (0)<br>A iii (2) | B i (20)<br>B ii (15)<br>B iii (4) | C i (1)<br>C ii (0)<br>C iii (1) | D i (−)<br>D ii (−)<br>D iii (−) | E i (24)<br>E ii (12)<br>E iii (6) |
| E | 1439.1100 | 24 | 15 | 7 | A i (1)<br>A ii (0)<br>A iii (2) | B i (22)<br>B ii (14)<br>B iii (6) | C i (1)<br>C ii (0)<br>C iii (1) | D i (21)<br>D ii (14)<br>D iii (5) | E i (−)<br>E ii (−)<br>E iii (−) |

FIG.21

| Receiving Terminal | Retransmitted Sequence Number | Retransmission Request Sequence Number | Total Number of Retransmission Request Receptions | Number of Retransmission Request Receptions | | | | |
|---|---|---|---|---|---|---|---|---|
| | | | | A | B | C | D | E |
| A | 3 | 3 | 0.7 | A (−) | B (0.7) | C (0.7) | D (0.7) | E (0.7) |
| B | 3,10 | 3,10 | 18.3 | A (0.8) | B (−) | C (0.9) | D (17.5) | E (18.4) |
| C | 3,7 | 3,7 | 0.8 | A (0.8) | B (0.1) | C (−) | D (0.7) | E (0.7) |
| D | 3 | 3,10 | 17.6 | A (0.8) | B (16.9) | C (0.7) | D (−) | E (18.6) |
| E | 3,10 | 3,10 | 19.6 | A (0.8) | B (18.0) | C (0.7) | D (17.3) | E (−) |

FIG.22

| | 841 | 842 | 843 i | 843 ii | 843 iii | 840 |
|---|---|---|---|---|---|---|
| | RECEIVING TERMINAL | PREVIOUS UPDATE TIME [sec] | PAST HISTORY (i) | PAST HISTORY (ii) | PAST HISTORY (iii) | NUMBER OF RETRANSMISSION REQUEST RECEPTIONS HISTORY |
| | A | 1329.2032 | 1 | 0 | 1 | A i (−)　B i (1)　C i (1)　D i (1)　E i (1)<br>A ii (−)　B ii (0)　C ii (0)　D ii (0)　E ii (0)<br>A iii (−)　B iii (1)　C iii (1)　D iii (1)　E iii (1) |
| | B | 1439.1123 | 0 | 22 | 15 | A i (0)　B i (−)　C i (0)　D i (1)　E i (0)<br>A ii (1)　B ii (−)　C ii (1)　D ii (21)　E ii (22)<br>A iii (0)　B iii (−)　C iii (1)　D iii (15)　E iii (15) |
| | C | 1430.5001 | 1 | 0 | 2 | A i (1)　B i (0)　C i (−)　D i (1)　E i (1)<br>A ii (0)　B ii (0)　C ii (−)　D ii (0)　E ii (0)<br>A iii (2)　B iii (1)　C iii (−)　D iii (1)　E iii (1) |
| | D | 1439.1123 | 1 | 20 | 15 | A i (1)　B i (0)　C i (−)　D i (−)　E i (0)<br>A ii (0)　B ii (20)　C ii (−)　D ii (−)　E ii (24)<br>A iii (2)　B iii (15)　C iii (−)　D iii (−)　E iii (12) |
| | E | 1439.1123 | 0 | 24 | 15 | A i (0)　B i (0)　C i (0)　D i (1)　E i (−)<br>A ii (1)　B ii (22)　C ii (1)　D ii (21)　E ii (−)<br>A iii (0)　B iii (14)　C iii (0)　D iii (14)　E iii (−) |

FIG.23

| Receiving Terminal | Retransmitted Sequence Number | Retransmission Request Sequence Number | Total Number of Retransmission Request Receptions | Number of Retransmission Request Receptions | | | | |
|---|---|---|---|---|---|---|---|---|
| | | | | A | B | C | D | E |
| A | 3 | 3 | 0.7 | A (−) | B (0.7) | C (0.7) | D (0.7) | E (0.7) |
| B | 3,10 | 3,10 | 8.1 | A (0.3) | B (−) | C (0.4) | D (8.1) | E (8.1) |
| C | 3,7 | 3,7 | 0.8 | A (0.8) | B (0.1) | C (−) | D (0.7) | E (0.7) |
| D | 3 | 3,10 | 8.1 | A (0.3) | B (7.5) | C (0.3) | D (−) | E (8.4) |
| E | 3,10 | 3,10 | 8.7 | A (0.3) | B (8.0) | C (0.3) | D (8.0) | E (−) |

| RECEIVING TERMINAL | RETRANSMITTED SEQUENCE NUMBER | RETRANSMISSION REQUEST SEQUENCE NUMBER | TOTAL NUMBER OF RETRANSMISSION REQUEST RECEPTIONS | NUMBER OF RETRANSMISSION REQUEST RECEPTIONS | | | | |
|---|---|---|---|---|---|---|---|---|
| A | 3 | 3 | 5 | A (-) | B (5) | C (5) | D (5) | E (5) |
| B | 3,10 | 3,10 | 30 | A (5) | B (-) | C (5) | D (20) | E (30) |
| C | 3,7 | 3,7 | 15 | A (5) | B (5) | C (-) | D (5) | E (5) |
| D | 3 | 3,10 | 30 | A (5) | B (29) | C (5) | D (-) | E (29) |
| E | 3,10 | 3,10 | 30 | A (5) | B (30) | C (5) | D (23) | E (-) |

| RECEIVING TERMINAL 811 | RETRANSMITTED SEQUENCE NUMBER 812 | RETRANSMISSION REQUEST SEQUENCE NUMBER 813 | TOTAL NUMBER OF RETRANSMISSION REQUEST RECEPTIONS 814 | NUMBER OF RETRANSMISSION REQUEST RECEPTIONS 815 | | | | |
|---|---|---|---|---|---|---|---|---|
| A | 3 | 3 | 5 | A (–) | B (5) | C (5) | D (5) | E (5) |
| B | 3,10 | 3,10 | 30 | A (5) | B (–) | C (5) | D (22) | E (30) |
| C | 3,7 | 3,7 | 15 | A (5) | B (5) | C (–) | D (5) | E (5) |
| D | 3 | 3,10 | 30 | A (5) | B (29) | C (5) | D (–) | E (29) |
| E | 3,10 | 3,10 | 30 | A (5) | B (30) | C (5) | D (25.3) | E (–) |

DATA TRANSMITTING APPARATUS AND DATA RETRANSMITTING METHOD

TECHNICAL FIELD

The present invention relates to a data transmitting apparatus and data retransmitting method that perform data retransmission according to a request from another apparatus.

BACKGROUND ART

With the rapid progress of communication networks in recent years, opportunities have increased for real-time communication of video and speech data among a plurality of recipients belonging to the same group, as in the case of teleconferencing systems and online gaming. In communications for such purposes, the same data is often transmitted to a plurality of recipients.

Multicast communication is known as a communication technology that efficiently transmits the same data to a plurality of recipients. In multicast communication, multimedia data distribution destinations are divided into groups, and packets are transmitted by multicast communication on a group-by-group basis.

If a data transmission source and data transmission destination are located in different segments, it has heretofore been necessary for all packet relay apparatuses (hereinafter referred to as "routers") on a route from the transmission source to the transmission destination to support multicast communication.

In contrast to this, in recent years communication methods that make possible multicast communication to a different segment even if all routers on a route do not support multicast communication have been developed and become increasingly widespread. Such communication methods include an explicit multicast method and overlay multicast method, for example.

First, packet distribution by means of an explicit multicast method will be described.

An explicit multicast method is a communication method whereby all transmission destinations are specified explicitly by storing the destination addresses of all data receiving apparatuses belonging to a group in an option header section or payload section of a transmission packet. An example of a typical explicit multicast method is XCAST (see Non-Patent Document 1).

With an explicit multicast method, even if a router that does not support an explicit multicast method is present on a route, data can be transmitted to all recipients whose destination addresses are stored in an IP (internet protocol) packet (hereinafter referred to simply as "packet"). At this time, which recipients a packet has been distributed to is managed by means of a bit sequence stored in the packet header or the like.

Each router has a unicast route table in which a destination prefix, next hop, and sending interface are mutually associated.

On arrival of a packet, a router supporting an explicit multicast method searches the unicast route table for all destination addresses stored in the option header or payload of the packet, and checks the sending interface corresponding to each destination address.

A router supporting an explicit multicast method deletes from the packet a destination address other than a destination address of a recipient included in a sending interface to which the packet is sent. Alternatively, a router supporting an explicit multicast method scans a bit sequence stored in the packet, and adds a distribution-completed mark to a destination address other than a destination address of a recipient included in a sending interface to which the packet is sent. Also, a router supporting an explicit multicast method rewrites a destination address entered in the IP header as a destination address of a distribution-unperformed recipient. When a packet is sent to a plurality of sending interfaces, a router supporting an explicit multicast method makes a number of duplicates of the packet equivalent to the number of sending interfaces, and performs destination address rewriting for each duplicated packet.

Also, if there is a distribution-unperformed destination address in a received packet, a data receiving apparatus supporting an explicit multicast method duplicates that packet, and rewrites the IP header destination address as a distribution-unperformed destination address before sending. At this time, a data receiving apparatus supporting an explicit multicast method deletes its own node address from distribution-unperformed destination addresses or changes a bit sequence stored in the packet header to "distribution-completed". Distribution implemented by having a received packet transmitted again from a data receiving apparatus to a router in this way is called "daisy-chain distribution".

On the other hand, a router not supporting an explicit multicast method searches the unicast route table for a destination address entered in the IP header, and sends a packet in the same way as in normal unicast communication. Also, a data receiving apparatus not supporting an explicit multicast method performs only normal reception processing.

Using the above technique, a packet can be distributed to all recipients by means of an explicit multicast method even if a router that does not support an explicit multicast method is present on a route. Therefore, use of an explicit multicast method makes it possible for multicast communication to be performed in an existing network such as the Internet.

Packet distribution by means of an overlay multicast method will now be described.

An overlay multicast method is a communication method whereby a packet is transmitted to all data receiving apparatuses belonging to a group by having a data receiving apparatus perform packet copying and transfer. A typical overlay multicast method is application level multicast (ALM). Packet distribution using ALM is described below.

FIG. 1 is a system configuration diagram showing a sample configuration of a communication system using ALM.

In FIG. 1, communication system 10 has a transmitting terminal (20), which is a data transmitting apparatus, and receiving terminals A through E (30a through 30e) that receive data distribution from the transmitting terminal.

With ALM, a virtual tree-structure network comprising packet distribution routes is constructed on an actual network. A virtual tree-structure network of this kind is called a delivery tree. In FIG. 1, the lines linking the apparatuses indicate the delivery tree configuration of communication system 10.

A receiving apparatus 30 having other receiving apparatuses 30 downstream of itself performs copying and downstream transfer of a packet, and in this way a packet is distributed to all receiving apparatuses 30. For example, receiving terminals D and E are downstream of receiving terminal B. On receiving a packet transferred from receiving terminal A, receiving terminal B first checks a routing table and determines that receiving terminals D and E are present downstream. Then receiving terminal B copies the received packet in order to transfer the packet to receiving terminals D and E, and transfers the copied packet to receiving terminals D and E.

Thus, with an overlay multicast method, a packet is distributed via distribution routes based on a delivery tree by having data receiving apparatuses perform the role of routers. A delivery tree is constructed by data receiving apparatuses exchanging information and a data transmitting apparatus creating a delivery tree.

Destruction or loss of a packet (hereinafter generically referred to as "packet loss") may occur due to congestion, a transmission error, or the like in a network. The occurrence of packet loss in stream data transmission causes in a gap in the stream data, resulting in a decrease in the quality of video or music played back on the receiving side. Especially in the case of video data that uses a compression codec employing a dependence relationship between video frames, such as MPEG (moving picture experts group) data, a single packet loss may cause lengthy disruption of video.

Thus, retransmission of data of a packet that has not reached its destination is conventionally performed. On receiving a data retransmission request (hereinafter referred to as "retransmission request") from a data receiving apparatus that has detected the occurrence of a packet loss, a data transmitting apparatus responds by retransmitting data stored in the packet for which a packet loss occurred by means of a retransmission packet. Retransmitting data stored in the packet for which a packet loss occurred enables data quality to be improved in the data receiving apparatus.

However, in so-called real-time communication, there is a requirement for the delay time from input to a data transmitting apparatus of data subject to transmission until playback of the data by a data receiving apparatus to be as short as possible. For example, in a teleconferencing system, an important factor is the delay time from the time at which video and speech are input to a data transmitting apparatus until the time at which video and speech are finally output from a video apparatus and speaker after undergoing data encoding in the data transmitting apparatus and data decoding in the data receiving apparatus (the playback time). This is because the delay time that is permissible in carrying on a conversation without experiencing a sense of abnormality is generally extremely short, at around 200 to 400 ms.

Since a data receiving apparatus cannot detect the occurrence of a packet loss until after receiving a subsequent packet, detection of a packet loss in a data receiving apparatus located downstream is slow. Also, for a data receiving apparatus located downstream, the both-way delay time (round trip time: RTT) vis-à-vis a data transmitting apparatus is lengthy. Therefore, if the permissible delay time is short, a situation arises in which a retransmission packet cannot reach a data receiving apparatus located downstream in time for data playback, and data quality cannot be improved despite the fact that retransmission is performed.

Thus, technologies that implement data retransmission control that maintains real-time processing in multicast communication are described in Patent Documents 1 and 2, for example.

According to a technology described in Patent Document 1, a data receiving apparatus that detects a packet loss makes a retransmission request to an intermediate node that transferred the packet rather than to the data transmitting apparatus that is the packet transmission source. Then, if the relevant packet is being held by the intermediate node, the intermediate node, and not the data transmitting apparatus that is the packet transmission source, performs packet retransmission. By this means, a delay time between the intermediate node and the data transmitting apparatus can be eliminated, and the securement of real-time processing is facilitated.

According to a technology described in Patent Document 2, a data receiving apparatus that detects a packet loss transmits a retransmission request to peripheral apparatuses using multicast communication. Of the data receiving apparatuses that receive the retransmission request, a data receiving apparatus that received and is holding the requested data packet transmits a retransmission packet using multicast communication. By this means, a retransmission packet can be made to arrive earlier than when a data transmitting apparatus transmits a retransmission packet, and the securement of real-time processing is facilitated.

Patent Document 1: Japanese Patent Application Laid-Open No. 2002-84239
Patent Document 2: Japanese Patent Application Laid-Open No. 2003-209576
Non-patent Document 1: Y. Imai, M. Shin and Y. Kim, "XCAST6: eXplicit Multicast on IPv6", IEEE/IPSJ SAINT2003 Workshop 4, IPv6 and Applications, Orland, January 2003.

DISCLOSURE OF INVENTION

Problems to be Solved by the Invention

However, with the technology described in Patent Document 1, each data receiving apparatus must determine to which intermediate node a retransmission request should be made, and it is therefore necessary for information relating to a delivery tree to be stored in each data receiving apparatus beforehand. Therefore, the technology described in Patent Document 1 is not only difficult to apply to an existing network, but is also difficult to apply to a case in which the structure of the delivery tree is unknown. A further problem is that if a packet loss occurs on the upstream side of the delivery tree, a retransmission request of a downstream data receiving apparatus is transmitted upstream while being buffered by an intermediate node, so that real-time processing is actually impaired.

Also, the technology described in Patent Document 2 is likewise difficult to apply to an existing network since each data receiving apparatus must be provided with a function for transmitting a retransmission packet using multicast communication according to a retransmission request from another data receiving apparatus. A further problem with the technology described in Patent Document 2 is that it supports a general IP multicast method, and therefore cannot be applied to XCAST or ALM in which a router or data receiving apparatus performs packet copying and transfer. XCAST and ALM are multicast methods for a small group of data transmission destinations at around ten locations. This is because, with a multicast method of this kind, relevancy between data receiving apparatuses is high, and there is a high probability of the same kind of packet not being able to be received even by a data receiving apparatus in the neighborhood of a data receiving apparatus that detects a packet loss.

In view of the above, it is desirable to be able to send a retransmission packet at early timing by a data transmitting apparatus alone without depending on functions of apparatuses on a route to a data receiving apparatus or relevancy between apparatuses, even if a delivery tree structure is unknown.

It is an object of the present invention to provide a data transmitting apparatus and data retransmitting method that enable a retransmission packet to be sent at early timing even if a delivery tree structure is unknown.

Means for Solving the Problem

A data transmitting apparatus of the present invention employs a configuration having: a retransmission request receiving section that receives a data retransmission request; a relevancy updating section that stores a past history of the number of receptions of a retransmission request sent from a first data receiving apparatus and a past history of the number of receptions of a retransmission request sent from another data receiving apparatus for which the object is identical to that of the retransmission request sent from the first data receiving apparatus; and a retransmission destination selection section that estimates a delivery tree from a history stored by the relevancy updating section on receiving a retransmission request from the first data receiving apparatus, and selects, in addition to the first data receiving apparatus, another data receiving apparatus located downstream of the first data receiving apparatus in the estimated delivery tree as a retransmission destination of the data.

A data retransmitting method of the present invention has: a retransmission request receiving step of receiving a data retransmission request from a first data receiving apparatus; a retransmission destination selecting step of estimating a delivery tree from a past history of the number of receptions of a retransmission request sent from the first data receiving apparatus and a past history of the number of receptions of a retransmission request sent from another data receiving apparatus for which the object is identical to that of the retransmission request sent from the first data receiving apparatus, and selecting, in addition to the first data receiving apparatus, another data receiving apparatus located downstream of the first data receiving apparatus in the estimated delivery tree as a retransmission destination of the data; and a retransmitting step of transmitting the data to a data receiving apparatus selected as a retransmission destination in the retransmission destination selecting step.

Advantageous Effects of Invention

According to the present invention, a delivery tree is estimated, and when there is a data retransmission request, another data receiving apparatus located downstream of the source of that request in the estimated delivery tree is added to data retransmission destinations. By this means, a retransmission packet can be sent at early timing without depending on functions of apparatuses on a route to a data receiving apparatus or relevancy between apparatuses, even if a delivery tree structure is unknown.

BRIEF DESCRIPTION OF DRAWINGS

FIG. 4 is a drawing showing a configuration of a relevancy storage table in Embodiment 1;

FIG. 8 is a drawing showing how the contents of a relevancy storage table change in Embodiment 1;

FIG. 9 is a drawing showing how the contents of a relevancy storage table change in Embodiment 1;

FIG. 10 is a drawing showing how the contents of a relevancy storage table change in Embodiment 1;

FIG. 12 is a drawing showing how the contents of a relevancy storage table change in Embodiment 1;

FIG. 14 is a drawing showing an example of the contents of a record update time table in Embodiment 2;

FIG. 16 is a drawing showing an example of the contents of a relevancy storage table at a certain point in time in Embodiment 2;

FIG. 17 is a drawing showing how the contents of a relevancy storage table change in Embodiment 2;

FIG. 18 is a drawing showing how the contents of a relevancy storage table change in Embodiment 2;

FIG. 19 is a drawing showing an example of the contents of a relevancy storage table at a certain point in time in Embodiment 2;

FIG. 20 is a drawing showing an example of the contents of a history storage table at the same point in time as in FIG. 19 in Embodiment 2;

FIG. 21 is a drawing showing how the contents of a history storage table change in Embodiment 2;

FIG. 22 is a drawing showing how the contents of a relevancy storage table change in Embodiment 2;

FIG. 23 is a drawing showing how the contents of a history storage table change in Embodiment 2;

FIG. 24 is a drawing showing how the contents of a relevancy storage table change in Embodiment 2;

FIG. 28 is a drawing showing an example of the contents of a relevancy storage table at a certain point in time in Embodiment 3; and FIG. 29 is a drawing showing how the contents of a relevancy storage table change in Embodiment 3.

BEST MODE FOR CARRYING OUT THE INVENTION

Now, embodiments of the present invention will be described in detail with reference to the accompanying drawings.

(Embodiment 1)

Figure 1:
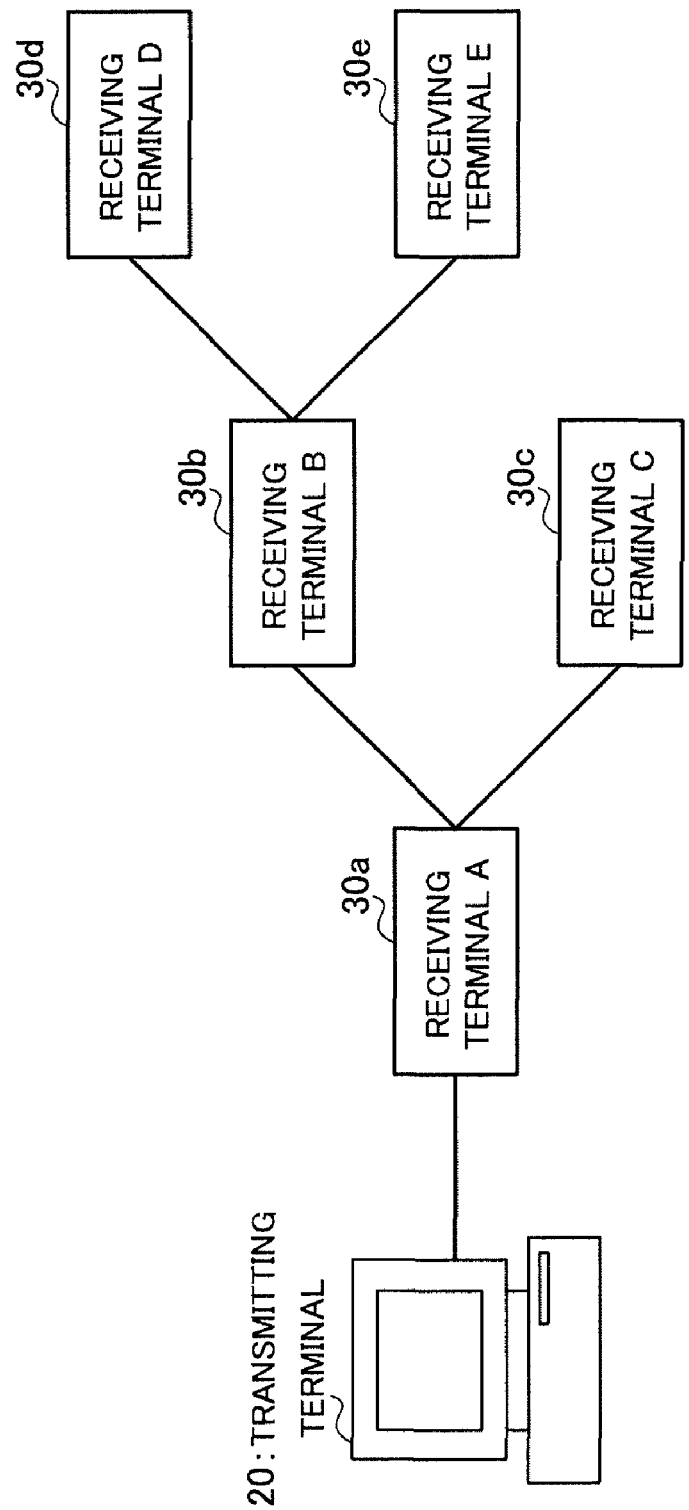
FIG. 1 is a system configuration diagram showing an example of the configuration of a conventional multicast communication system.
Figure 2:
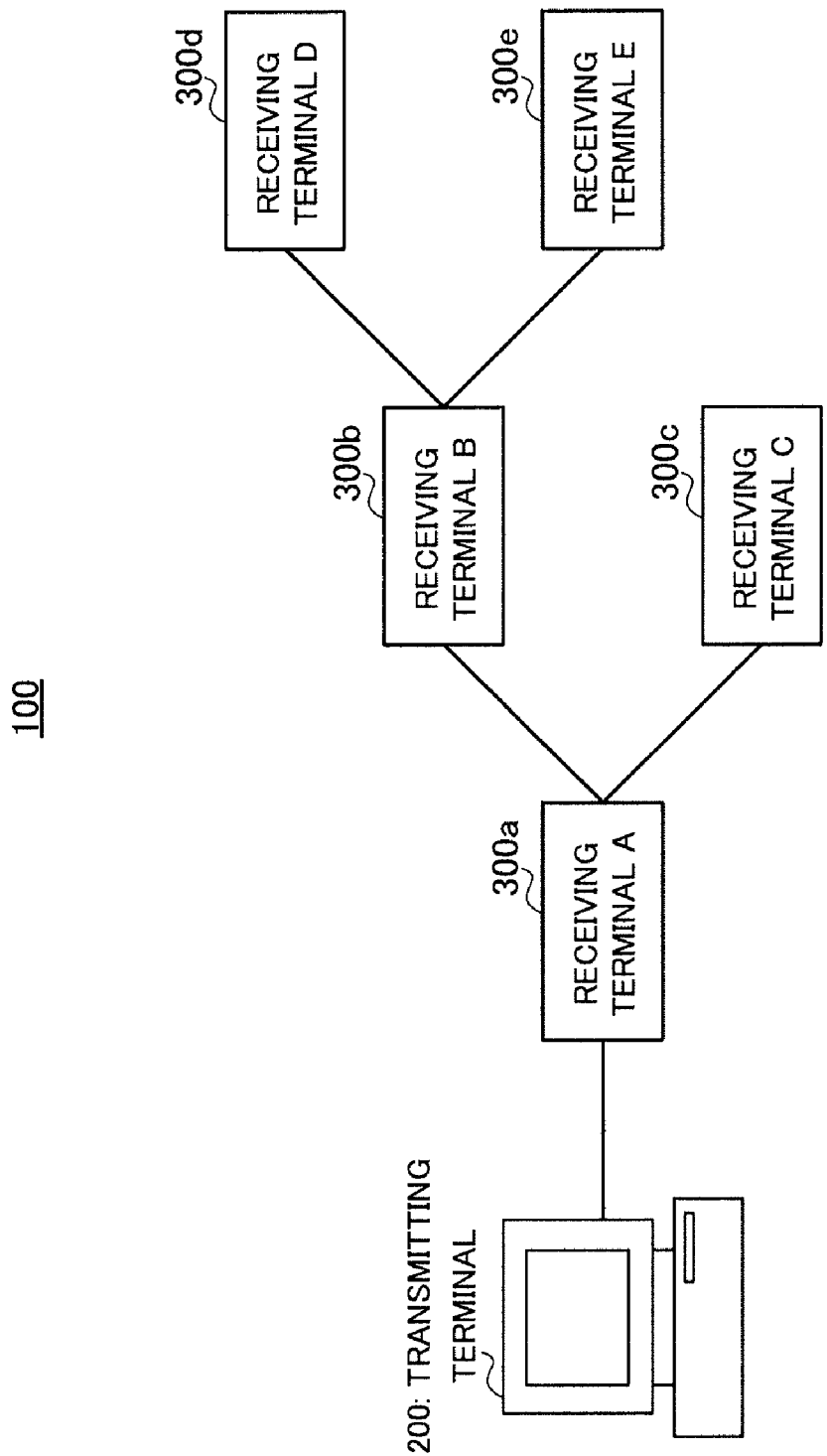
FIG. 2 is a system configuration diagram showing a configuration of a communication system that includes a data transmitting apparatus according to Embodiment 1 of the present invention.

FIG. 2 is a system configuration diagram showing a configuration of a communication system that includes a transmitting terminal serving as a data transmitting apparatus according to Embodiment 1 of the present invention. This embodiment is an example in which the present invention is applied to a teleconferencing system in which video and speech are distributed to multipoint destinations in real time.

In FIG. 2, communication system 100 has transmitting terminal 200 that performs packet distribution using explicit multicast communication, and receiving terminals 300a through 300e that receive packet distribution from transmitting terminal 200. Transmitting terminal 200 and receiving terminals 300a through 300e belong to the same small group. To simplify the following description, when receiving terminals 300a through 300e are mentioned individually they will be referred to as receiving terminals A through E.

Transmitting terminal 200 stores video and speech stream data comprising a distribution object in a data packet to which a sequence number is assigned, and distributes this to receiving terminals A through E.

Sequence numbers are serial numbers for indicating the order of data packets. Transmitting terminal 200 performs retransmission of distributed data in response to requests from receiving terminals A through E.

Receiving terminals A through E each receive a data packet for which that terminal is a destination, and play back the original stream data. Also, receiving terminals A through E detect the occurrence of a packet loss from a gap in received packet sequence numbers, and issue a data retransmission request to transmitting terminal 200. Specifically, receiving terminals A through E generate a retransmission request packet containing the sequence number of a data packet that has not been received and identification information such as an IP address or port number for identifying the terminal, and transmit this retransmission request packet to transmitting terminal 200.

Receiving terminals A and B support an explicit multicast method, and if a destination to which transmission has not been performed is specified in a received packet, duplicate the received packet and transfer the packet to the destination to which transmission has not been performed. On the other hand, receiving terminals C through E do not support an explicit multicast method, and do not perform packet transfer.

In FIG. 2, the lines linking the terminals indicate the configuration of a delivery tree constructed by communication system 100.

In communication system 100, the transfer destination of a transmitting terminal 200 packet is receiving terminal A, transfer destinations of a receiving terminal A packet are receiving terminals B and C, and transfer destinations of a receiving terminal B packet are receiving terminals D and E. Receiving terminals D and E are located downstream of receiving terminal B, and receiving terminals B and C are located downstream of receiving terminal A.

Before describing the configuration and operation of transmitting terminal 200, a general outline will be given of the method by which a retransmission packet is sent at early timing in this embodiment.

As can be seen from FIG. 2, a packet that has not reached receiving terminal B does not reach receiving terminals D and E either. Therefore, data for which retransmission is requested by receiving terminal B also has its retransmission requested by receiving terminals D and E. Furthermore, a packet that has not reached receiving terminal A does not reach receiving terminals B through E either. Therefore, data for which retransmission is requested by receiving terminal A also has its retransmission requested by receiving terminals B through E.

Normally, when a packet loss occurs, a retransmission request of a receiving terminal 300 located upstream reaches transmitting terminal 200 earlier than a retransmission request of a receiving terminal 300 located farther downstream. Therefore, by also transmitting a retransmission packet to another receiving terminal 300 located downstream of the receiving terminal 300 that is the retransmission request packet transmission source (hereinafter referred to for convenience as "retransmission request source"), transmitting terminal 200 can send a retransmission packet to the downstream receiving terminal 300 before reception of an actual retransmission request packet. Also, if the distance on the network between transmitting terminal 200 and a receiving terminal 300 located downstream is shorter than between transmitting terminal 200 and a receiving terminal 300 located upstream, a retransmission request from the downstream receiving terminal 300 may reach transmitting terminal 200 earlier than a retransmission request from the upstream receiving terminal 300. In this case also, since transmitting terminal 200 can receive a retransmission request from the upstream receiving terminal 300, a retransmission packet can also be sent to the upstream receiving terminal at the point in time at which a retransmission request is first received from the downstream receiving terminal. This shows that retransmission at early timing is possible even if an actual delivery tree and an estimated delivery tree do not match.

In order to implement this kind of precedent retransmission packet sending, it is necessary for transmitting terminal 200 to estimate which receiving terminals are located downstream of which receiving terminal 300—that is, the delivery tree constructed by communication system 100.

The way in which delivery tree estimation is performed will now be described. First, the number of times a retransmission request is executed by each receiving terminal 300 (hereinafter referred to as "number of retransmission requests") is considered.

The number of retransmission requests of receiving terminals located downstream is a value greater than or equal to the number of retransmission requests of receiving terminals 300 located downstream of the terminal itself. In communication system 100 shown in FIG. 2, the number of retransmission requests of receiving terminals D and E is greater than or equal to the number of retransmission requests of receiving terminal B, and the number of retransmission requests of receiving terminals B through E is greater than or equal to the number of retransmission requests of receiving terminal A. If the numbers of retransmission requests of receiving terminals A through E at an arbitrary point in time are designated $N_A$ through $N_E$ in order, the magnitude relationship of the numbers of retransmission requests of receiving terminals 300 can be expressed by following Equation (1).

$$N_A \geq N_B \geq N_D$$

$$N_A \geq N_B \geq N_E$$

$$N_A \geq N_C \tag{1}$$

If any two receiving terminals 300 are designated first and second receiving terminals, there are three possible relative arrangement patterns of these two receiving terminals: "an arrangement pattern in which the first receiving terminal is upstream of the second receiving terminal", "an arrangement pattern in which the second receiving terminal is upstream of the first receiving terminal", and "an arrangement pattern in which the first receiving terminal and the second receiving terminal are on different routes".

If the number of retransmission requests of the first receiving terminal is greater than or equal to the number of retransmission requests of the second receiving terminal, the possibility of "an arrangement pattern in which the first receiving terminal is upstream of the second receiving terminal" can be eliminated. Also, if the number of retransmission requests of the second receiving terminal is greater than or equal to the number of retransmission requests of the first receiving terminal, the possibility of "an arrangement pattern in which the second receiving terminal is upstream of the first receiving terminal" can be eliminated.

However, the magnitude relationship of numbers of retransmission requests for receiving terminals 300 on different routes, such as receiving terminal B and receiving terminal C, for example, is indeterminate. Therefore, it is difficult to determine which of the remaining two arrangement patterns applies from only the number of retransmission requests of each receiving terminal 300.

Thus, the object of a retransmission request of each receiving terminal 300 is next considered.

With the above-described first and second receiving terminals, the higher the proportion of retransmission requests made for the same packet, the lower is the possibility of "an arrangement pattern in which the first receiving terminal and the second receiving terminal are on different routes". That is to say, there is a greater possibility of the first receiving terminal and second receiving terminal being located on the same route.

Furthermore, for example, the higher the proportion of packets for which a retransmission request is made from the first receiving terminal for which a retransmission request is also made from the second receiving terminal, the greater is the possibility of the first receiving terminal being located upstream of the second receiving terminal.

That is to say, the relative arrangement pattern of a first receiving terminal and second receiving terminal in a delivery tree can be estimated based on the proportion of packets for which a retransmission request is made from the first receiving terminal for which a retransmission request is also made from the second receiving terminal.

Thus, transmitting terminal 200 of this embodiment determines whether or not a packet for which retransmission is requested by an individual receiving terminal 300 has also had its retransmission requested by another receiving terminal 300, and estimates a delivery tree of retransmission requests of each receiving terminal 300 based on the result of this determination. Specifically, transmitting terminal 200 performs the above-described determination each time a retransmission request is received, and records the determination results. Also, each time a retransmission request is received, transmitting terminal 200 determines whether or not there is another receiving terminal 300 located downstream of the retransmission request source in a delivery tree estimated from past records. Then, if there is such a receiving terminal 300, transmitting terminal 200 retransmits a packet to that other receiving terminal 300 located downstream before actual retransmission request reception. By this means, a retransmission packet can be sent promptly to a receiving terminal 300 located downstream.

The configuration and operation of transmitting terminal 200 will now be described. First, the configuration of transmitting terminal 200 will be described.

Figure 3:
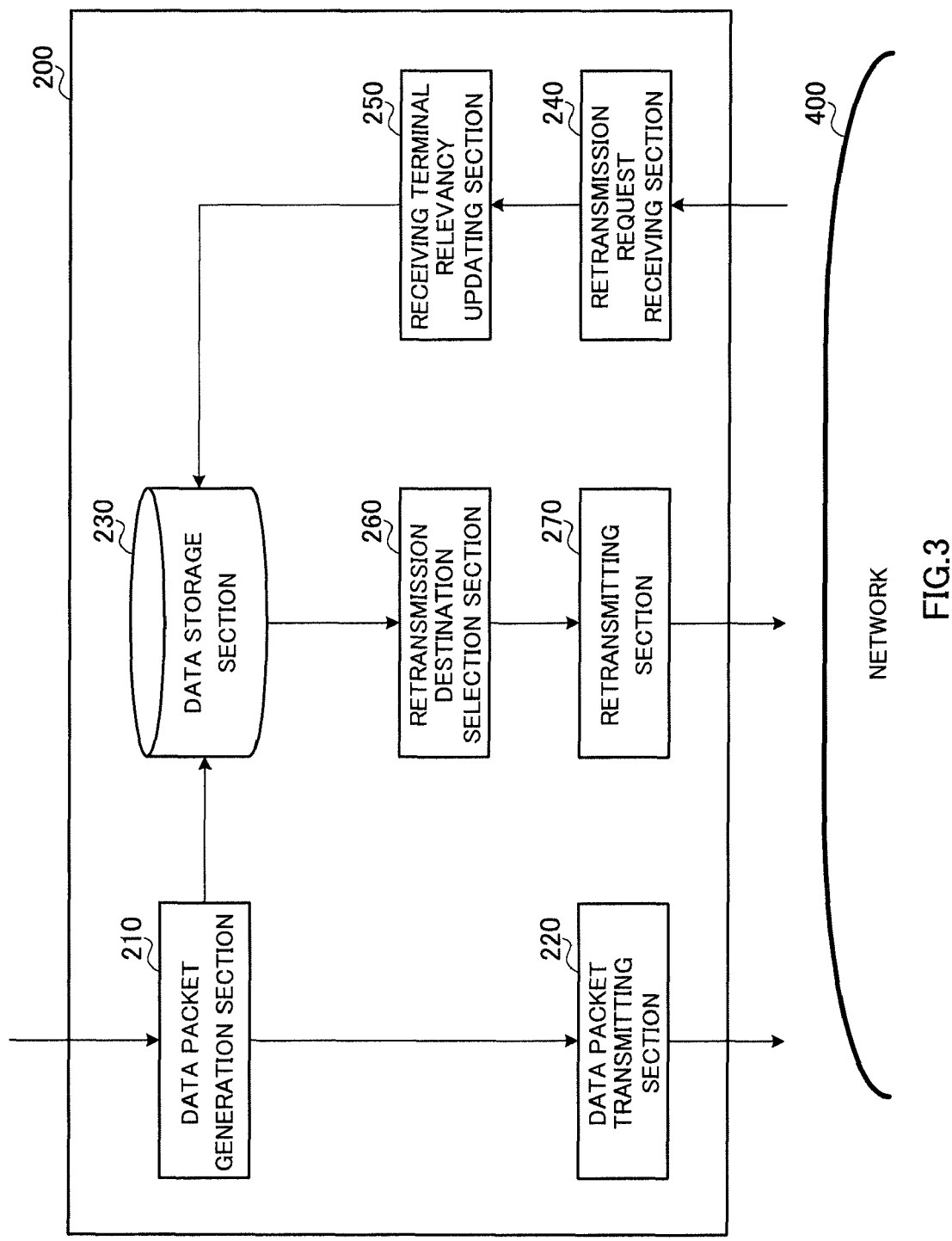
FIG. 3 is a block diagram showing a configuration of a transmitting terminal serving as a data transmitting apparatus according to Embodiment 1.

FIG. 3 is a block diagram showing the configuration of transmitting terminal 200 according to Embodiment 1.

In FIG. 3, transmitting terminal 200 has data packet generation section 210, data packet transmitting section 220, data storage section 230, retransmission request receiving section 240, receiving terminal relevancy updating section 250, retransmission destination selection section 260, and retransmitting section 270.

Data packet generation section 210 has video and speech stream data input from an external encoder or suchlike apparatus (not shown). In a teleconferencing system, the video and speech are input using a digital camera and microphone (neither of which is shown). Data packet generation section 210 divides the input video and speech stream data and constructs a data packet storing the divided data. This data packet is an explicit multicast packet that specifies receiving terminals A through E explicitly as destinations. Each data packet is assigned a sequence number in ascending order in accordance with the order of division. Data packet generation section 210 stores a constructed data packet in data storage section 230 for retransmission use, and also outputs the packet to data packet transmitting section 220.

Data packet transmitting section 220 sends a data packet input from data packet generation section 210 to network 400 in which receiving terminals A through E are located. Here, the transfer destination of a transmitting terminal 200 data packet is receiving terminal A, as shown in FIG. 2.

Data storage section 230 stores a data packet for retransmission input from data packet generation section 210, and also holds a table for storing relevancy for retransmission requests of receiving terminals A through E (hereinafter referred to as "relevancy storage table").

FIG. 4 is a drawing showing the configuration of a relevancy storage table. Relevancy storage table 810 has the following columns: Receiving Terminal 811, Retransmitted Sequence Number 812, sequence number of a data packet that is a retransmission request object (hereinafter referred to as "Retransmission Request Sequence Number") 813, Total Number of Retransmission Request Receptions 814, and Number of Retransmission Request Receptions 815.

Information identifying receiving terminals A through E is entered in Receiving Terminal 811. The other columns 812 through 815 are associated with each of receiving terminals A through E. For the sake of brevity, information on each receiving terminal 300 entered in relevancy storage table 810 will be referred to collectively as a "record".

In Retransmitted Sequence Number 812, the sequence number of a data packet retransmitted to receiving terminal 300 is entered. In Retransmission Request Sequence Number 813, the sequence number of a data packet for which retransmission has been requested by receiving terminal 300 is entered. In Total Number of Retransmission Request Receptions 814, the total number of receptions of a retransmission request sent from receiving terminal 300 (hereinafter referred to as "total number of retransmission request receptions") is entered. In Number of Retransmission Request Receptions 815, the number of times a retransmission request having the same sequence number has been received from another related receiving terminal 300 is entered for each receiving terminal 300. An initial value of "0" is entered in Total Number of Retransmission Request Receptions 814 and Number of Retransmission Request Receptions 815.

The contents of relevancy storage table 810 are updated by receiving terminal relevancy updating section 250 shown in FIG. 3 based on a received retransmission request packet.

Retransmission request receiving section 240 shown in FIG. 3 receives retransmission request packets from receiving terminals A through E.

Figure 5:
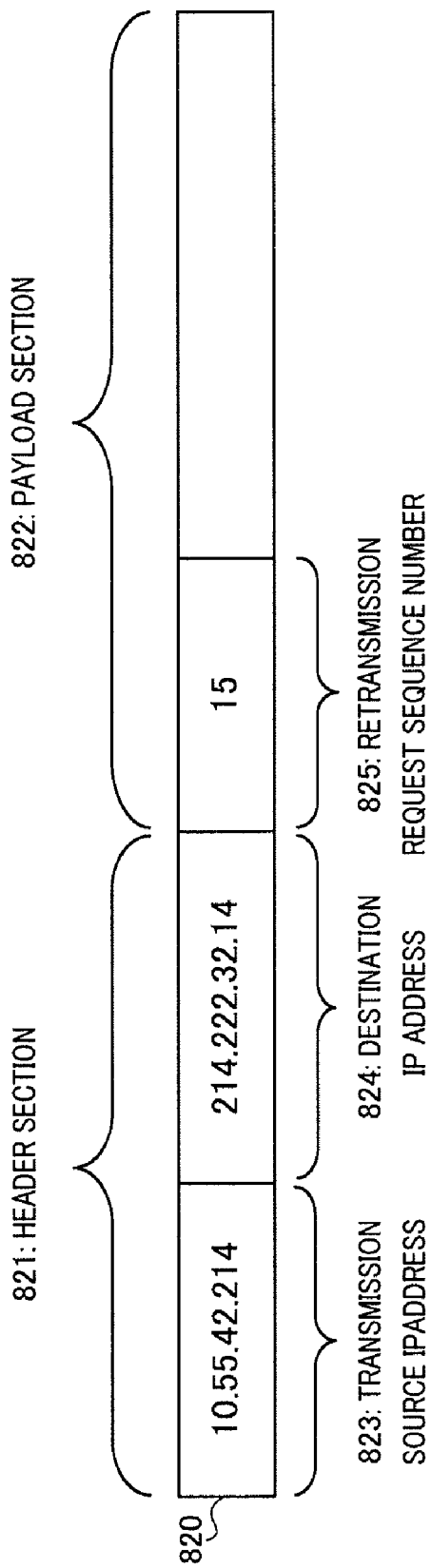
FIG. 5 is a drawing showing an example of the configuration of a retransmission request packet in Embodiment 1.

FIG. 5 is a drawing showing an example of the configuration of a retransmission request packet.

As shown in FIG. 5, retransmission request packet 820 is composed of header section 821 and payload section 822. Entered in header section 821 are transmission source IP address 823, which is the IP address of the retransmission request source, and destination IP address 824, which is the IP address of the retransmission request transmission destination (here, transmitting terminal 200). It is possible to identify a retransmission request source from transmission source IP address 823. In payload section 822, retransmission request sequence number 825 is entered.

A retransmission request source IP address may be entered in payload section 822. Also, if a unique ID number has been assigned to each receiving terminal 300 beforehand, that ID may be entered in payload section 822. Furthermore, a retransmission request sequence number, also, may be entered in header section 821, as in the case of an RTP (real-time transport protocol) header.

Retransmission request receiving section 240 shown in FIG. 3 acquires retransmission request sequence number 825 and transmission source IP address 823 from received retransmission request packet 820, and analyzes the retransmission request source of received retransmission request packet 820. Then retransmission request receiving section 240 outputs the acquired retransmission request sequence number and information uniquely indicating the analyzed retransmission request source (hereinafter referred to as "retransmission request source information") to receiving terminal relevancy updating section 250 via data storage section 230.

Retransmission request receiving section 240 may also acquire retransmission request source information from information other than transmission source IP address 823, such as a port number entered in a data packet. Also, transmission source IP address 823 may be treated directly as retransmission request source information. Furthermore, a combination of a plurality of items of information, such as transmission source IP address 823 and a port number, may be treated as retransmission request source information.

Receiving terminal relevancy updating section 250 updates relevancy storage table 810 shown in FIG. 4 based on a retransmission request sequence number and retransmission request source information input from retransmission request receiving section 240. Specifically, receiving terminal relevancy updating section 250 enters in relevancy storage table 810, for each receiving terminal 300, a proportion of packets for which retransmission has been requested in the past by each receiving terminal 300 for which retransmission has also been requested by another receiving terminal 300.

Retransmission destination selection section 260 estimates a delivery tree based on relevancy storage table 810 updated by receiving terminal relevancy updating section 250 each time a retransmission request sequence number and retransmission request source information are input from receiving terminal relevancy updating section 250, and selects receiving terminal 300 to which precedence should be given when transmitting a retransmission packet. Specifically, when the occurrence proportion of retransmission request from another receiving terminal 300 for packets for which retransmission has been requested in the past by the retransmission request source is higher than a predetermined threshold value, retransmission destination selection section 260 estimates the relevant other receiving terminal 300 to be a receiving terminal located downstream of the retransmission request source in the delivery tree. Then the receiving terminal estimated to be located downstream of the retransmission request source is selected as a retransmission packet transmission destination together with the retransmission request source and a retransmission packet is constructed, and all constructed retransmission packets are output to retransmitting section 270.

Retransmitting section 270 transmits a retransmission packet input from retransmission destination selection section 260 to network 400. A retransmission packet transmitted to network 400 is transferred to the specified transmission destination by means of a router (not shown) and receiving terminals A and B.

Although not shown, transmitting terminal 200 has a CPU (central processing unit), a storage medium such as ROM (read only memory) that stores a control program, working memory such as RAM (random access memory), and a communication circuit. The functions of the sections shown in FIG. 3 are implemented by execution of the control program by the CPU.

The operation of transmitting terminal 200 having the above configuration will now be described. Here, the operation of transmitting terminal 200 when it receives a retransmission request packet will be described using FIG. 6 through FIG. 12.

Figure 6:
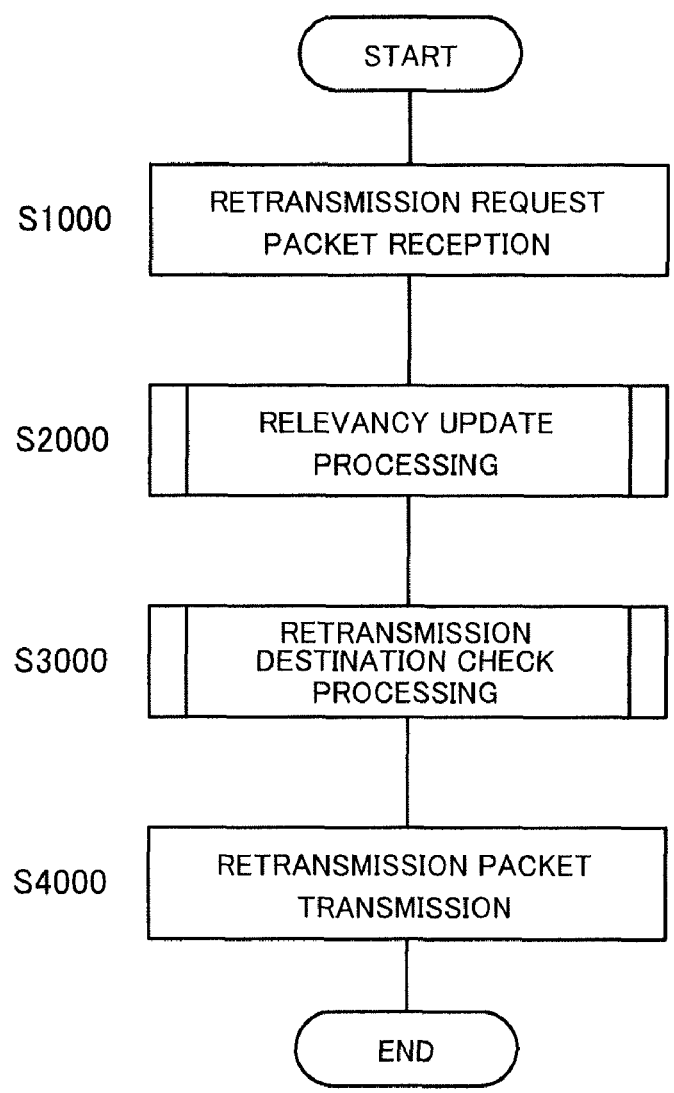
FIG. 6 is a flowchart showing the overall operation flow of a transmitting terminal when it receives a retransmission request packet in Embodiment 1.

FIG. 6 is a flowchart showing the overall operation flow of transmitting terminal 200 when it receives a retransmission request packet.

First, in step S1000, retransmission request receiving section 240 receives a retransmission request packet, acquires a retransmission request sequence number from the retransmission request packet, and acquires retransmission request source information (a transmission source IP address, port number, or the like) identifying the receiving terminal that is the retransmission request source.

Then, in step S2000, retransmission request receiving section 240 outputs the retransmission request sequence number and retransmission request source information to receiving terminal relevancy updating section 250. Based on the retransmission request sequence number and retransmission request source information input from retransmission request receiving section 240, receiving terminal relevancy updating section 250 executes relevancy update processing that updates relevancy storage table 810 (see FIG. 4). Then, after updating relevancy storage table 810, receiving terminal relevancy updating section 250 outputs the retransmission request sequence number and retransmission request source information to retransmission destination selection section 260 via data storage section 230. Details of relevancy update processing will be given later herein.

Next, in step S3000, retransmission destination selection section 260 executes retransmission destination check processing based on the retransmission request sequence number, retransmission request source information, and relevancy storage table 810. Retransmission destination check processing is processing whereby a receiving terminal 300 for which it can be determined that the same data has been lost as the data lost by the retransmission request source is checked, a retransmission packet (see FIG. 5) is constructed with a relevant receiving terminal 300 as a destination, and is output to retransmitting section 270. Details of retransmission destination check processing will be given later herein.

Then, in step S4000, retransmitting section 270 transmits all retransmission packets input from retransmission destination selection section 260 to network 400. Then the series of processing steps is terminated.

Relevancy update processing performed by receiving terminal relevancy updating section 250 will now be described in detail.

Figure 7:
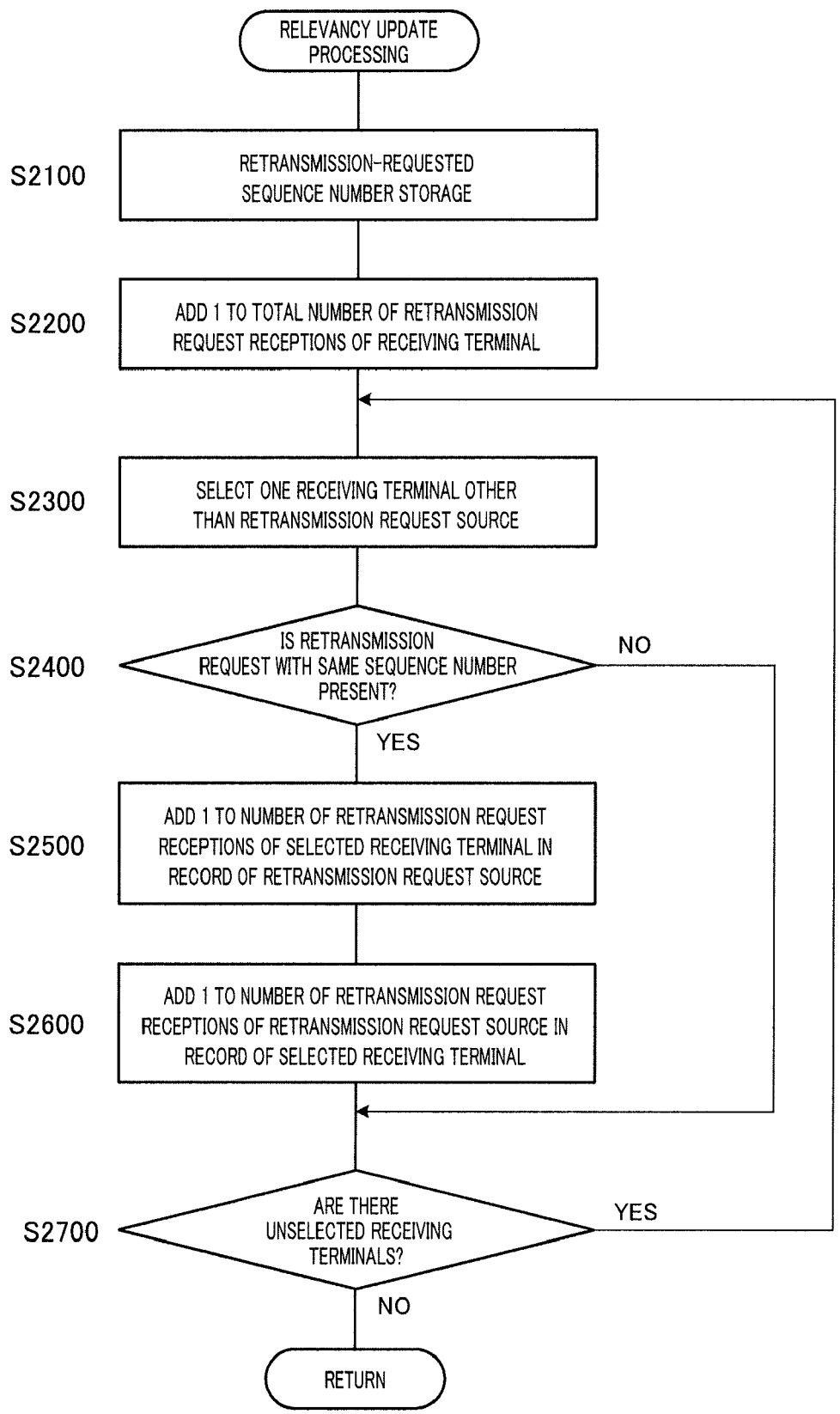
FIG. 7 is a flowchart showing the flow of relevancy update processing in Embodiment 1.

FIG. 7 is a flowchart showing the flow of relevancy update processing (step S2000 in FIG. 6). FIG. 8 through FIG. 10 are drawings showing how the contents of relevancy storage table 810 change when relevancy update processing is performed on relevancy storage table 810 shown in FIG. 4.

Here, a case will be described by way of example in which "10" is received as a retransmission request sequence number from receiving terminal D when relevancy storage table 810 is in the state shown in FIG. 4. As shown in FIG. 4, "10" has already been received as a retransmission request sequence number from receiving terminal B and receiving terminal E.

First, in step S2100, receiving terminal relevancy updating section 250 receiving terminal relevancy updating section 250 mutually associates a retransmission request sequence number and retransmission request source information input from retransmission request receiving section 240, and stores them in data storage section 230. Specifically, receiving terminal relevancy updating section 250 enters an input retransmission request sequence number in Retransmission Request Sequence Number 813 of the record of the retransmission request source in relevancy storage table 810.

After the above-described processing, relevancy storage table 810 is in a state in which "10" has been added to Retransmission Request Sequence Number 813 of receiving terminal D, as shown in FIG. 8.

Then, in step S2200 in FIG. 7, receiving terminal relevancy updating section 250 adds a value of "1" to the value of Total Number of Retransmission Request Receptions 814 of the retransmission request source in relevancy storage table 810.

After the above-described processing, relevancy storage table 810 is in a state in which the value of Total Number of Retransmission Request Receptions 814 of receiving terminal D has been updated from "29" to "30", as shown in FIG. 9.

Then, in step S2300 in FIG. 7, receiving terminal relevancy updating section 250 selects one receiving terminal 300 other than the retransmission request source.

Next, in step S2400, receiving terminal relevancy updating section 250 checks whether or not a sequence number that is the same as the present retransmission request sequence number is included in retransmission request sequence numbers received in the past from currently selected receiving terminal (hereinafter referred to simply as "selected receiving terminal") 300 that is a receiving terminal 300 other than the retransmission request source. Specifically, receiving terminal relevancy updating section 250 determines whether or not a sequence number that is the same as the present retransmission request sequence number has been entered in Retransmission Request Sequence Number 813 of the record of selected receiving terminal 300 in relevancy storage table 810. Receiving terminal relevancy updating section 250 proceeds to step S2500 if the same sequence number has been entered (S2400: YES), or proceeds to step S2700 if the same sequence number has not been entered (S2400: NO).

In step S2500, receiving terminal relevancy updating section 250 adds a value of "1" to the value of selected receiving terminal 300 in Number of Retransmission Request Receptions 815 of the record of the retransmission request source in relevancy storage table 810.

Then, in step S2600, receiving terminal relevancy updating section 250 adds a value of "1" to the value of the retransmission request source in Number of Retransmission Request Receptions 815 of the record of selected receiving terminal 300 in relevancy storage table 810.

In step S2700, receiving terminal relevancy updating section 250 determines whether or not there are unselected receiving terminals 300 other than the retransmission request source. If there are unselected receiving terminals 300 (S2700: YES), receiving terminal relevancy updating section 250 returns to step S2300, selects one unselected receiving terminal 300, and repeats the processing. If processing has been completed for all receiving terminals 300 (S2700: NO), receiving terminal relevancy updating section 250 terminates the series of processing steps and returns to the processing shown in FIG. 6.

Thus, as a result of relevancy update processing by receiving terminal relevancy updating section 250, the value of Number of Retransmission Request Receptions 815 in the record of each receiving terminal 300 becomes a value indicating how many times a retransmission request for which the sequence number is the same as that of a retransmission request from that receiving terminal 300 has been made by another receiving terminal 300.

After execution of relevancy update processing, relevancy storage table 810 is in a state in which the value of receiving terminal B and the value of receiving terminal E in Number of Retransmission Request Receptions 815 of the record of receiving terminal D have each been updated from "29" to "30", as shown in FIG. 10. This is because a packet having the same sequence number as present retransmission request sequence number "10" has already also had its retransmission requested by receiving terminals B and E. Also, the value of receiving terminal D in Number of Retransmission Request Receptions 815 of the records of receiving terminals B and E has been updated from "29" to "30". This is because a packet having the same sequence number as retransmission request sequence number "10" already received from receiving terminals B and E has had its retransmission requested this time by receiving terminal D.

Retransmission destination check processing by retransmission destination selection section 260 will now be described in detail.

Figure 11:
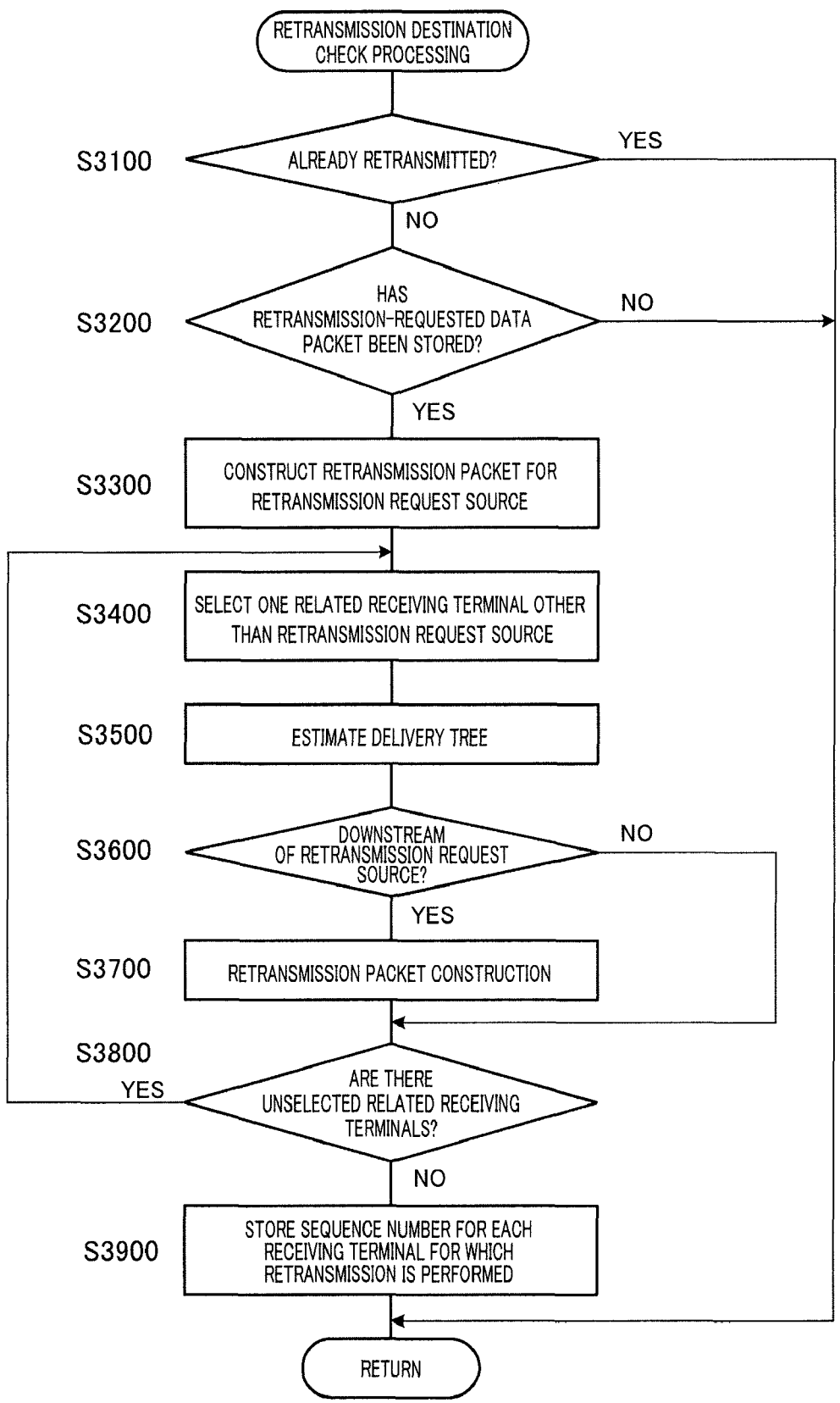
FIG. 11 is a flowchart showing the flow of retransmission destination check processing in Embodiment 1.

FIG. 11 is a flowchart showing the flow of retransmission destination check processing (step S3000 in FIG. 6).

First, in step S3100, retransmission destination selection section 260 checks whether or not data for which retransmission has been requested this time has already been retransmitted to the retransmission request source. Specifically, retransmission destination selection section 260 checks whether or not a retransmission request sequence number input this time has been entered in Retransmitted Sequence Number 812 of the record of the retransmission request source in relevancy storage table 810. This is because a retransmission packet may already have been transmitted to the present retransmission request source based on a retransmission request from another receiving terminal 300.

Retransmission destination selection section 260 proceeds to step S3200 if a retransmission packet has not yet been transmitted to retransmission request source receiving terminal 300 (S3100: NO), or returns to the processing shown in FIG. 6 without generating a retransmission packet if a retransmission packet has already been transmitted (S3100: YES). By this means, duplicate transmission of a retransmission packet can be prevented if a retransmission packet of requested data has already been transmitted to the present retransmission request source.

In step S3200, retransmission destination selection section 260 checks whether or not a data packet corresponding to the retransmission request sequence number has been stored in data storage section 230. Retransmission destination selection section 260 proceeds to step S3300 if the result of this check shows that a corresponding data packet has been stored (S3200: YES), or returns to the processing shown in FIG. 6 without generating a retransmission packet, since the requested data does not exist, if a corresponding data packet has not been stored (S3200: NO).

In step S3300, retransmission destination selection section 260 constructs a retransmission packet from a data packet for retransmission corresponding to the retransmission request sequence number, stored in data storage section 230.

Then, in step S3400, retransmission destination selection section 260 refers to relevancy storage table 810 stored in data storage section 230, and selects one related receiving terminal 300 other than the retransmission request source receiving terminal 300.

Next, in step S3500, retransmission destination selection section 260 checks whether or not another receiving terminal 300 is downstream of the retransmission request source based on relevancy storage table 810, and estimates a delivery tree. Whether or not another receiving terminal 300 is downstream is determined based on a history of values of receiving terminals 300 that are transmission sources of the retransmission request packet received this time in Number of Retransmission Request Receptions 815 of receiving terminals 300 that transmitted a retransmission request packet for the same sequence number, stored in relevancy storage table 810. Then, based on the estimated delivery tree, retransmission destination selection section 260 selects a receiving terminal 300 located downstream of the retransmission request source as a retransmission packet transmission destination.

As an example of a criterion for estimating a delivery tree, retransmission destination selection section 260 calculates "relevance" (also known as "degree of association"), which is a value obtained by dividing the value of a selected receiving terminal 300 in Number of Retransmission Request Receptions 815 of a record of the retransmission request source by the value of Total Number of Retransmission Request Receptions 814 of the record of the retransmission request source. Retransmission destination selection section 260 determines a receiving terminal 300 for which relevance is high to be located downstream of the retransmission request source in a delivery tree, and estimates a delivery tree.

As a criterion for estimating a delivery tree, retransmission destination selection section 260 may also simply select a terminal with a close Number of Retransmission Request Receptions 815 value. Alternatively, retransmission destination selection section 260 may determine whether or not receiving terminals 300 are located downstream of a retransmission request source according to whether or not the number of retransmission requests for the same sequence number is close and those retransmission requests were able to be received within a short time period, and select those terminals as retransmission request destinations. This is because the possibility of a retransmission request from a receiving terminal 300 downstream in the delivery tree being received within a short time period is high.

Here, it is assumed that delivery tree estimation and retransmission destination receiving terminal selection are performed using relevance.

For a receiving terminal 300 located downstream of a retransmission request source, also, the possibility of a packet loss occurring for the same data packet as a data packet whose retransmission has been requested by the retransmission request source is high. Therefore, the above-described predetermined threshold value is a maximum value of relevance for which it should be determined that packet loss has not occurred in selected receiving terminal 300, and this can be found through experimentation or experience.

In step S3600, retransmission destination selection section 260 determines whether or not selected receiving terminal 300 is located downstream of the retransmission request source from the delivery tree estimated in step S3500. Specifically, retransmission destination selection section 260 determines whether or not above-described relevance is higher than a predetermined threshold value. If selected receiving terminal 300 is located downstream of the retransmission request source—that is, if relevance is higher than the predetermined threshold value—(S3600: YES), retransmission destination selection section 260 proceeds to step S3700. On the other hand, if selected receiving terminal 300 is not located downstream of the retransmission request source—that is, if relevance is less than or equal to the predetermined threshold value—(S3600: NO), retransmission destination selection section 260 proceeds to step S3800 without going through step S3700.

In step S3700, retransmission destination selection section 260 constructs a retransmission packet for selected receiving terminal 300. This retransmission packet construction is performed at a stage at which a retransmission request has not been received from selected receiving terminal 300.

Then, in step S3800, retransmission destination selection section 260 determines whether or not there are unselected related receiving terminals 300. If the result of this determination is that there are unselected related receiving terminals 300 (S3800: YES), retransmission destination selection section 260 returns to step S3400, selects one unselected related receiving terminal 300, and repeats the processing. If processing has been completed for all related receiving terminals 300 (S3800: NO), retransmission destination selection section 260 proceeds to step S3900.

In step S3900, retransmission destination selection section 260 stores the sequence number of a packet that is the object of the present retransmission for each receiving terminal 300 for which data retransmission is performed. Specifically, retransmission destination selection section 260 adds the sequence number of a data packet that is the object of retransmission to Retransmitted Sequence Number 812 of the record of each receiving terminal 300 to which a retransmission packet is transmitted in relevancy storage table 810. Then retransmission destination selection section 260 terminates the series of processing steps and returns to the processing shown in FIG. 6. All retransmission packets constructed in step S3700 are input to retransmitting section 270, and are transmitted to network 400 by retransmitting section 270 in step S4000 in FIG. 6.

Thus, as a result of retransmission destination check processing by retransmission destination selection section 260, a retransmission packet can be constructed and sent to a downstream receiving terminal 300 with a high probability of having suffered a packet loss prior to an actual retransmission request from that receiving terminal 300.

The higher the predetermined threshold value used in step S3600 determination processing, the more difficult it becomes for precedent retransmission packet sending to be executed, with the result that unnecessary retransmission packet sending can be decreased and the network load can be alleviated. Also, the lower the predetermined threshold value, the easier it becomes for precedent retransmission packet sending to be executed, with the result that speeding-up of retransmission packet sending can be actively implemented.

This predetermined threshold value may be a fixed value decided at the start of communication, or may be varied according to the number of retransmission request receptions. Normally, if the number of retransmission request receptions is small, the reliability of calculated relevance is low. Therefore, a good balance between alleviation of the network load and speeding-up of retransmission packet sending can be achieved by setting the predetermined threshold value high in the initial state, and lowering the predetermined threshold value as the number of retransmission request receptions increases, for example.

FIG. 12 is a drawing showing how the contents of relevancy storage table 810 change when retransmission destination check processing and retransmission processing are performed on relevancy storage table 810 shown in FIG. 10.

An example is shown here of how the contents of relevancy storage table 810 change when "10" is input to retransmission destination selection section 260 as a retransmission request sequence number, and information indicating receiving terminal D is input as retransmission request source information, when relevancy storage table 810 is in the state shown in FIG. 10.

As shown in FIG. 12, after retransmission destination check processing has been executed, relevancy storage table 810 is in a state in which sequence number "10" has been added to Retransmitted Sequence Number 812 of the receiving terminal D record.

Retransmission destination check processing and processing results will now be described, taking as an example a case in which "15" is input to retransmission destination selection section 260 as a retransmission request sequence number, and information indicating receiving terminal B is input as retransmission request source information, when relevancy storage table 810 is in the state shown in FIG. 12.

In the receiving terminal B record, Total Number of Retransmission Request Receptions 814 is "30", and Number of Retransmission Request Receptions 815 values for receiving terminals A and C through E are "5", "5", "30", and "30". Relevance values obtained by dividing the Number of Retransmission Request Receptions 815 values for receiving terminals A and C through E by the Total Number of Retransmission Request Receptions 814 value are "0.17", "0.17", "1.0", and "1.0". If, for example, a predetermined threshold value of "0.5" has been set, the relevance values of receiving terminals D and E are higher than the predetermined threshold value. Therefore, in addition to receiving terminal B, which is the retransmission request source, receiving terminals D and E are also selected as retransmission packet transmission destinations.

Receiving terminals D and E are located downstream of receiving terminal B. Therefore, normally, detection of a packet loss in receiving terminals D and E is later than detection of a packet loss in receiving terminal B, and the arrival at transmitting terminal 200 of retransmission requests from receiving terminals D and E is later than the arrival at transmitting terminal 200 of a retransmission request from receiving terminal B. By also sending a retransmission packet to receiving terminals D and E based on a retransmission request from receiving terminal B, the sending timing of a retransmission packet to receiving terminals D and E can be made earlier than if a retransmission packet is sent based on retransmission requests from receiving terminals D and E.

With regard to retransmission packet construction and transmission, a retransmission packet may be constructed for each transmission destination, and transmitted to the respective receiving terminals 300 by means of unicast communication. Alternatively, one multicast packet may be constructed using XCAST or ALM, and transmitted to each receiving terminal 300 by means of multicast communication. Also, when using XCAST for data packet retransmission, a plurality of XCAST packets in which the order of destinations entered in the address list is changed so that a receiving terminal 300 is at the start may be constructed and transmitted. Then again, if a retransmission packet is lost, provision may be made for it to be transferred from another receiving terminal 300.

As described above, according to this embodiment, transmitting terminal 200 creates relevancy storage table 810 for estimating a delivery tree of communication system 100. Then, on receiving a data retransmission request, transmitting terminal 200 estimates a delivery tree based on relevancy storage table 810, and adds another receiving terminal 300 located downstream of the retransmission request source in the estimated delivery tree to the retransmission packet transmission destinations. By this means, it is possible for sending of a retransmission packet for a receiving terminal 300 located downstream in the delivery tree to be performed at early timing even if the delivery tree structure is unknown. Therefore, it is possible for a retransmission packet to arrive by a playback time, and retransmission control can be implemented that is suitable for real-time communication in which a permitted delay time is short. Also, a retransmission packet is sent at early timing by transmitting terminal 200 alone without depending on functions of apparatuses on a route to transmission destination receiving terminal 300 or relevancy between apparatuses, enabling this embodiment to be applied easily to an existing network.

(Embodiment 2)

Embodiment 2 improves responsivity of network state changes by performing weighting so that the influence of a temporally new retransmission request is given emphasis when updating relevancy between receiving terminals.

Figure 13:
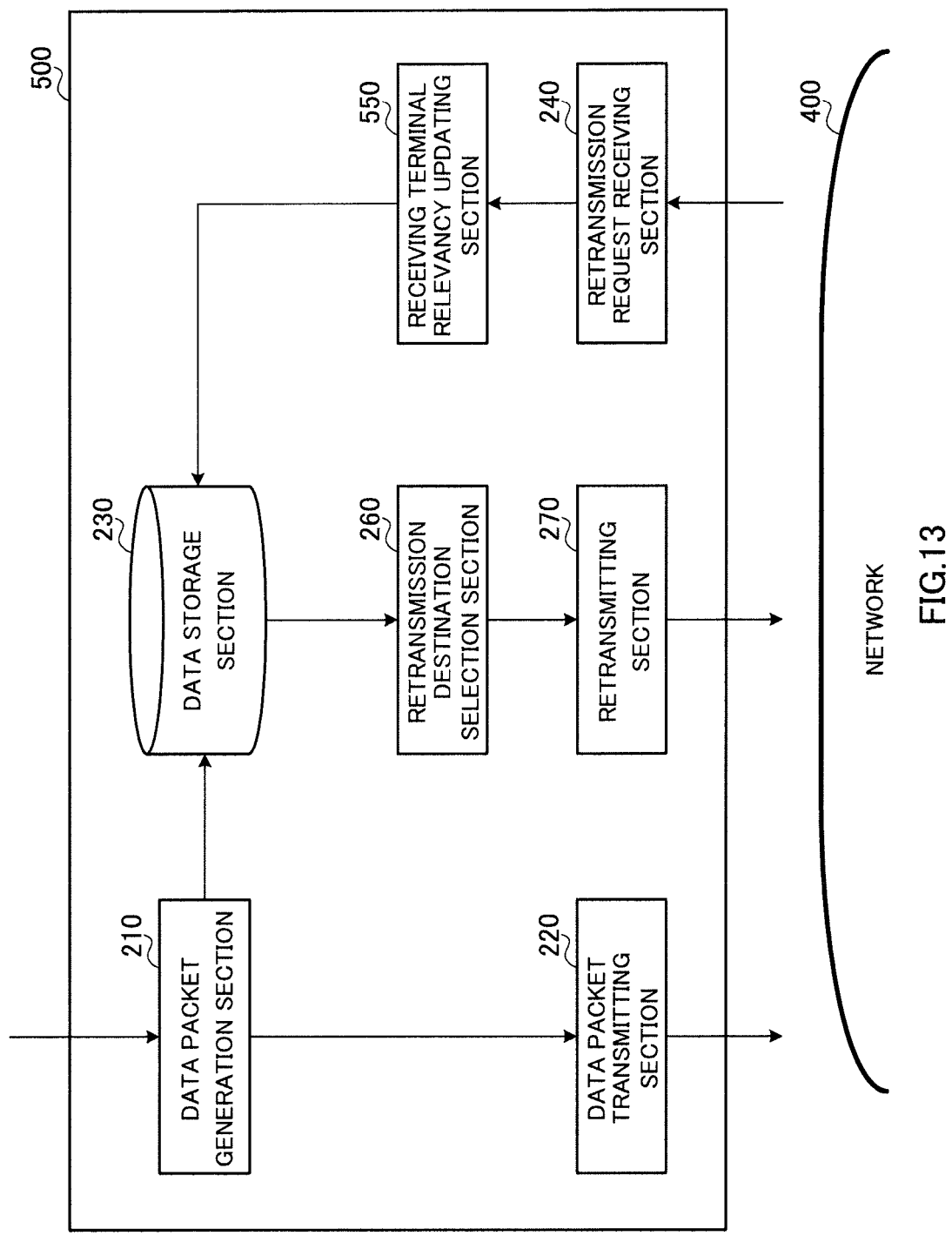
FIG. 13 is a block diagram showing a configuration of a transmitting terminal serving as a data transmitting apparatus according to Embodiment 2 of the present invention.

FIG. 13 is a block diagram showing a configuration of a transmitting terminal serving as a data transmitting apparatus according to Embodiment 2 of the present invention, and corresponds to FIG. 3 of Embodiment 1. Parts in FIG. 13 identical to those in FIG. 3 are assigned the same codes as in FIG. 3, and descriptions thereof are omitted here.

In FIG. 13, transmitting terminal 500 has receiving terminal relevancy updating section 550 instead of receiving terminal relevancy updating section 250 shown in FIG. 3.

Receiving terminal relevancy updating section 550 updates relevancy storage table 810 shown in FIG. 4 based on a retransmission request sequence number and retransmission request source information input from retransmission request receiving section 240.

Also, when updating relevancy storage table 810, receiving terminal relevancy updating section 550 performs greater weighting for a temporally newer update difference among differences before and after updating. For this weighting, receiving terminal relevancy updating section 550 creates a record update time table for recording the latest update time of each record in relevancy storage table 810, and stores this table in data storage section 230.

FIG. 14 is a drawing showing an example of the contents of a record update time table stored in data storage section 230.

Record update time table 830 is composed of two columns: Receiving Terminal 831 and Previous Update Time [sec] 832. In Receiving Terminal 831, information indicating receiving terminals A through E is entered. In Previous Update Time 832 the latest time of times at which a corresponding record of relevancy storage table 810 was updated is entered for each receiving terminal 300. FIG. 14 shows a case in which times are stored as seconds (sec) as an example, but times may be stored using any unit and format as long as the elapsed time from the previous retransmission request can be identified.

Relevancy update processing by receiving terminal relevancy updating section 550 will now be described in detail. The operation of transmitting terminal 500 when it receives a retransmission request packet will be described here using FIG. 15 through FIG. 19.

Figure 15:
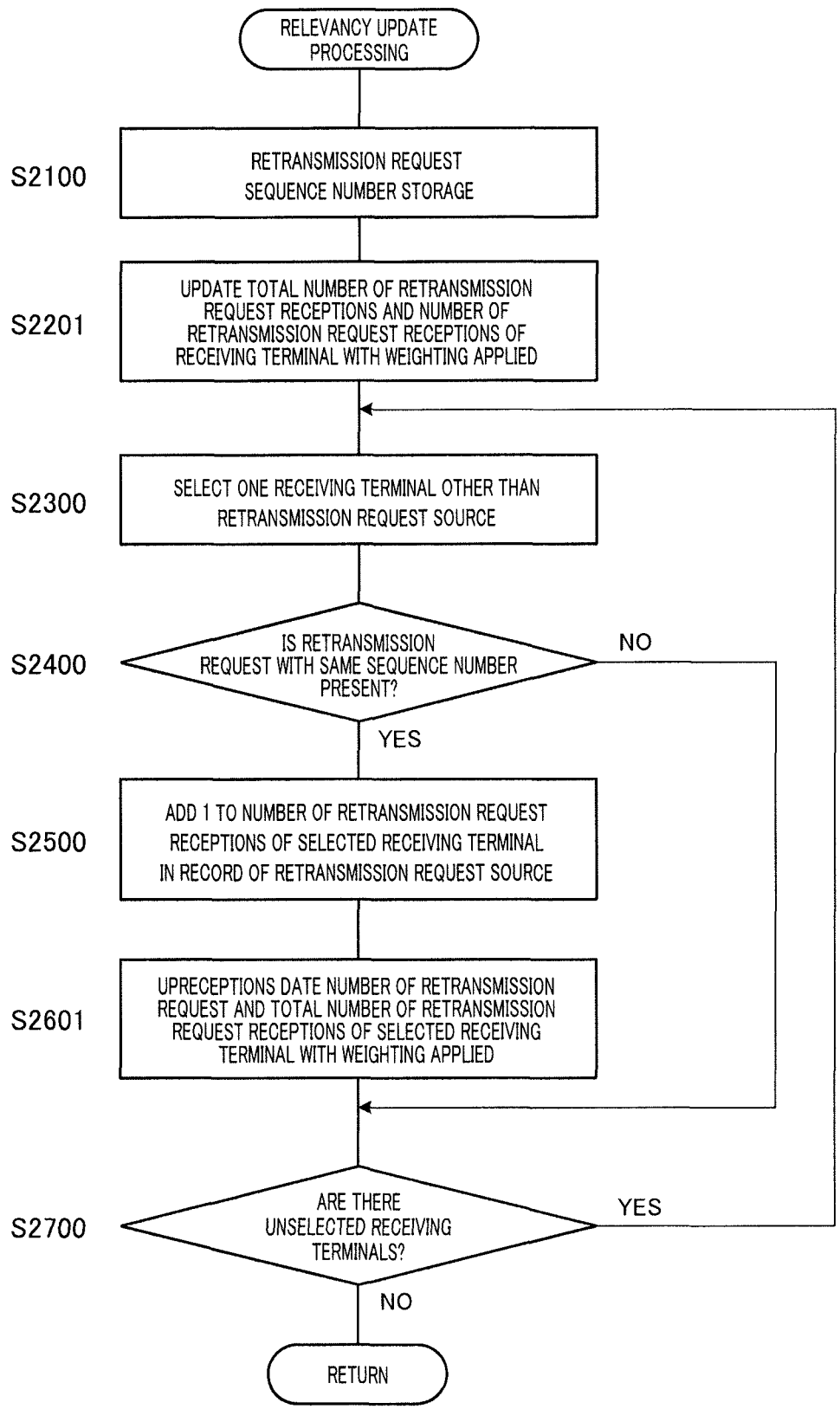
FIG. 15 is a flowchart showing the flow of relevancy update processing in Embodiment 2.

FIG. 15 is a flowchart showing the flow of relevancy update processing (step S2000 in FIG. 6, FIG. 7). Parts in FIG. 15 identical to those in FIG. 7 are assigned the same step numbers as in FIG. 7, and descriptions thereof are omitted here.

After storing the sequence number of a data packet for which retransmission has been requested in step S2100, receiving terminal relevancy updating section 550 proceeds to step S2201.

In step S2201, receiving terminal relevancy updating section 550 updates a value of the record of the retransmission request source in relevancy storage table 810 so that greater weight is applied to update contents based on a retransmission request packet received this time. Then receiving terminal relevancy updating section 550 acquires the current time, and enters this in Previous Update Time 832 of the present retransmission request source.

Specifically, receiving terminal relevancy updating section 550 first calculates a weighting coefficient to be applied to a value prior to retransmission request source record updating using Equation (2) below, for example.

Weighting coefficient=−1/0.05×(present retransmission request reception time−previous record update time)+1    (2)

In above Equation (2), "present retransmission request reception time" is the reception time of the present retransmission request packet, and "previous record update time" is the time at which the record of the present retransmission request source was last updated in relevancy storage table 810. The value entered in Previous Update Time 832 of the present retransmission request source in record update time table 830 can be used for "previous record update time".

That is to say, receiving terminal relevancy updating section 550 calculates a value obtained by subtracting a value obtained by dividing the elapsed time from the previous record update by 0.05 from 1. The minimum value of the weighting coefficient is assumed to be 0.1. Therefore, if a value calculated by means of Equation (2) is less than or equal to 0.1, receiving terminal relevancy updating section 550 determines the weighting coefficient to be 0.1. The denominator of the first term in Equation (2) (here, 0.05) is a parameter that determines relevancy storage table 810 responsivity of network changes, and is a value using the same units as a retransmission request reception time.

A weighting coefficient calculated by means of Equation (2) decreases along with lengthening of the elapsed time from the previous update of the retransmission request source record.

Using the weighting coefficient calculated by means of Equation (2), receiving terminal relevancy updating section 550 updates the value of Total Number of Retransmission Request Receptions 814 of the record of the retransmission request source, using Equation (3) shown below, for example.

Total number of retransmission request receptions=current total number of retransmission request receptions×weighting coefficient+1    (3)

Also, using the calculated weighting coefficient, receiving terminal relevancy updating section 550 updates all values of Number of Retransmission Request Receptions 815 of the record of the retransmission request source, using Equation (4) shown below, for example.

Number of retransmission request receptions=number of retransmission request receptions×weight    (4)

That is to say, for the record of the retransmission request source, receiving terminal relevancy updating section 550 performs updating corresponding to the present retransmission request after multiplying a currently entered value by the weighting coefficient. By this means, the longer the elapsed time from the previous record update, the relatively greater is the weight applied to the present update contents.

The 0.05 denominator of the first term in Equation (2) is just an example, and the influence of a temporally newer retransmission request packet can be strengthened by making this value smaller, or, conversely, network responsivity can be weakened by making this value larger. Furthermore, the 0.01 minimum value is also just an example, and this value can be changed according to the degree to which past history is taken into account.

If a sequence number identical to the present retransmission request sequence number has been entered in Retransmission Request Sequence Number 813 of the record of selected receiving terminal 300, receiving terminal relevancy updating section 550 proceeds to step S2601 via step S2500.

In step S2601, receiving terminal relevancy updating section 550 updates the values of Number of Retransmission Request Receptions 815 and Total Number of Retransmission Request Receptions 814 of the record of selected receiving terminal 300 so that greater weight is applied to update contents based on the retransmission request packet received this time. Then receiving terminal relevancy updating section 550 acquires the current time, and enters this in Previous Update Time 832 of selected receiving terminal 300 in record update time table 830.

Specifically, receiving terminal relevancy updating section 550 first calculates a weighting coefficient to be applied to a value prior to retransmission request source record updating using above Equation (2), for example. "Previous record update time" here is the time at which the record of selected receiving terminal 300 was last updated in relevancy storage table 810. The value entered in Previous Update Time 832 of selected receiving terminal 300 in record update time table 830 can be used for "previous record update time".

Then, using the calculated weighting coefficient and above Equation (4), for example, receiving terminal relevancy updating section 550 updates the values of all receiving terminals 300 other than the retransmission request source in Number of Retransmission Request Receptions 815 of the record of receiving terminal 300.

Also, using the calculated weighting coefficient and Equation (5) shown below, for example, receiving terminal relevancy updating section 550 updates a retransmission request source value in Number of Retransmission Request Receptions 815 of the record of selected receiving terminal 300.

Number of retransmission request receptions=current number of retransmission request receptions×weight+1    (5)

Furthermore, using the calculated weighting coefficient and Equation (6) shown below, for example, receiving terminal relevancy updating section 550 updates the value of Total Number of Retransmission Request Receptions 814 of the record of selected receiving terminal 300.

Total number of retransmission request receptions=current total number of retransmission request receptions×weight    (6)

That is to say, for the selected receiving terminal 300 record, receiving terminal relevancy updating section 550 performs updating corresponding to the present retransmission request after multiplying a currently entered value by the weighting coefficient. By this means, the longer the elapsed time from the previous record update, the relatively greater is the weight applied to the present update contents.

The processing in above-described steps S2500 and S2601 is executed on all receiving terminals 300 that have already transmitted a retransmission request for a sequence number identical to the sequence number for which retransmission has been requested this time.

Thus, as a result of relevancy update processing by receiving terminal relevancy updating section 550, relevancy storage table 810 is updated with weighting being performed in the time domain.

Record update time table 830 updating may also be performed together at the end of relevancy update processing.

By making the weight of the newest update contents greater along with lengthening of the elapsed time from the previous update, when there is a change in the delivery tree the contents of relevancy storage table 810 can be brought close to contents matching the current delivery tree in a shorter time. That is to say, responsivity of relevancy storage table 810 contents with respect to delivery tree changes can be improved.

An example of how relevancy storage table 810 contents are changed by the above processing will now be described.

FIG. 16 is a drawing showing the contents of relevancy storage table 810 at a certain point in time. FIG. 17 and FIG. 18 are drawings showing how the contents of relevancy storage table 810 change when the relevancy update processing shown in FIG. 15 is performed on relevancy storage table 810 shown in FIG. 16.

An example is shown here of how the contents of relevancy storage table 810 change when a retransmission request packet specifying sequence number "10" is received from receiving terminal D at time 1439.0340 [sec]. It is assumed that record update time table 830 is in the state shown in FIG. 14 at the above reception time.

The time difference between the previous update time and the present update time of the record of receiving terminal D, which is the retransmission request source, is 1439.0340−1439.0040=0.03 [sec]. Therefore, the weighting coefficient calculated using Equation (2) is −1/0.05×0.03+1=0.4.

As shown in FIG. 16, the pre-update value of Total Number of Retransmission Request Receptions 814 in the receiving terminal D record is "29". Therefore, as a result of using Equation (3) and weighting coefficient 0.4, the value of Total Number of Retransmission Request Receptions 814 for receiving terminal D is updated to 29×0.4+1=12.6, as shown in FIG. 17.

As shown in FIG. 16, the pre-update values of Number of Retransmission Request Receptions 815 for receiving terminals A through C and E in the receiving terminal D record are "5", "25", "5", and "22". Therefore, as a result of using Equation (4) and weighting coefficient 0.4, the Number of Retransmission Request Receptions 815 values for receiving terminals A through C and E in the receiving terminal D record are updated to "2", "10", "2", and "8.8", as shown in FIG. 17.

It is assumed here that receiving terminal B has been selected before receiving terminal E in step S2300 in FIG. 15, and that receiving terminals B and E have already made a retransmission request for a sequence number identical to the present retransmission request sequence number (here, sequence number "10").

The time difference between the previous update time and the present update time of the record of receiving terminal B is 1439.0340−1438.997=0.037 [sec]. Therefore, the weighting coefficient calculated using Equation (2) is −1/0.05×0.037+1=0.26.

As shown in FIG. 16, the pre-update values of Number of Retransmission Request Receptions 815 for receiving terminals A and C through E in the receiving terminal B record are "5", "5", "25", and "30". Therefore, as a result of using Equation (4) and weighting coefficient 0.26, the Number of Retransmission Request Receptions 815 values for receiving terminals A, C, and E (receiving terminals 300 other than the retransmission request source) in the receiving terminal B record are updated to "1.3", "1.3", and "7.8", as shown in FIG. 17. Also, as a result of using Equation (5) and weighting coefficient 0.26, the Number of Retransmission Request Receptions 815 value for receiving terminal D (the retransmission request source) in the receiving terminal B record is updated to "7.5", as shown in FIG. 17.

As shown in FIG. 16, the Total Number of Retransmission Request Receptions 814 value of the receiving terminal B record is "30". Therefore, as a result of using Equation (6) and weight "0.26", the Total Number of Retransmission Request Receptions 814 value of the receiving terminal B record is updated to "7.8", as shown in FIG. 17.

The time difference between the previous update time and the present update time of the record of receiving terminal E is 1439.0340−1439.0010=0.033 [sec]. Therefore, the weight calculated using Equation (2) is −1/0.05×0.033+1=0.34.

As shown in FIG. 17, the pre-update values of Number of Retransmission Request Receptions 815 for receiving terminals A through D in the receiving terminal E record are "5", "30", "5", and "24". Therefore, as a result of using Equation (4) and weighting coefficient 0.34, the Number of Retransmission Request Receptions 815 values for receiving terminals A through D (receiving terminals 300 other than the retransmission request source) in the receiving terminal E record are updated to "1.7", "10.2", and "1.7", as shown in FIG. 18. Also, as a result of using Equation (5) and weighting coefficient 0.34, the Number of Retransmission Request Receptions 815 value for receiving terminal D (the retransmission request source) in the receiving terminal E record is updated to "9.16", as shown in FIG. 18.

As shown in FIG. 16, the Total Number of Retransmission Request Receptions 814 value of the receiving terminal E record is "30". Therefore, as a result of using Equation (6) and weight "0.34", the Total Number of Retransmission Request Receptions 814 value of the receiving terminal E record is updated to "10.2", as shown in FIG. 18.

In order to execute weighting precisely, histories of per-fixed-interval total numbers of retransmission requests and numbers of retransmission requests of related receiving terminals 300 may be stored for a past plurality of times, and a weighting coefficient may be set on a history-by-history basis.

In this case, receiving terminal relevancy updating section 550 creates a table (hereinafter referred to as "history storage table") storing a past plurality of histories of per-fixed-interval total numbers of retransmission requests and numbers of retransmission requests of related receiving terminals 300. Then receiving terminal relevancy updating section 550 performs relevancy storage table 810 updating based on this history storage table. Examples will now be given of the contents and update processing of an above-described history storage table, and how table contents change with respect to relevancy storage table 810 update processing based on a history storage table.

FIG. 19 is a drawing showing an example of the contents of relevancy storage table 810 at a certain point in time, and FIG. 20 is a drawing showing an example of the contents of a history storage table at the above-mentioned point in time. FIG. 21 and FIG. 23 are drawings showing how the contents of the history storage table in FIG. 20 change and FIG. 22 and FIG. 24 are drawings showing how the contents of relevancy storage table 810 in FIG. 19 change. Below, suffix "i" indicates the newest history relating to a retransmission request, suffix "ii" indicates the next newest history, and suffix "iii" indicates the next newest history after that.

History storage table 840 shown in FIG. 20 is created by receiving terminal relevancy updating section 550, and is stored in data storage section 230. History storage table 840 has the following columns: Receiving Terminal 841, Previous Update Time 842, Past History 843, and Number of Retransmission Request Receptions History 844. In Past History 843, past three histories 843i through 843 iii are entered. In Number of Retransmission Request Receptions History 844, past three histories are entered for each of receiving terminals A through E.

In Receiving Terminal 841, information identifying receiving terminals A through E is entered. The other columns correspond to receiving terminals A through E on an individual basis. To simplify the following description, information for each receiving terminal 300 entered in regulating member 804 will be referred to collectively as a "history record".

Past History 843 in history storage table 840 corresponds to Total Number of Retransmission Request Receptions 814 in relevancy storage table 810, and Number of Retransmission Request Receptions History 844 corresponds to Number of Retransmission Request Receptions 815 in relevancy storage table 810.

Receiving terminal relevancy updating section 550 divides a total number of retransmission request receptions and a number of retransmission request receptions of related receiving terminals 300 at fixed intervals. Then receiving terminal relevancy updating section 550 stores a divided total number of retransmission request receptions in Past History 843 of history storage table 840, and stores a divided number of retransmission request receptions in Number of Retransmission Request Receptions History 844. Furthermore, receiving terminal relevancy updating section 550 applies a weighting coefficient based on newness to these histories divided at fixed intervals, and updates Total Number of Retransmission Request Receptions 814 and Number of Retransmission Request Receptions 815 in relevancy storage table 810 based on the result of this calculation.

Here, it is assumed that the above fixed interval is 10 seconds, and that three histories are stored. Also, it is assumed that weighting coefficients applied to the past three histories are "0.6", "0.3", and "0.1", in new-to-old temporal order. That is to say, greater weighting is applied to a newer history. If it is wished to place more emphasis on an old history, a weighting coefficient for an old history can be set higher, and if it is wished to place more emphasis on a new history, a weighting coefficient for a new history can be set higher.

Each time a retransmission request packet is received, receiving terminal relevancy updating section 550 determines whether or not 10 seconds have elapsed from the previous record update time of the retransmission request source. If the elapsed time is within 10 seconds, rewriting of a numeric value in the newest history in history storage table 840 is performed, whereas if the elapsed time exceeds 10 seconds, a shift of history information in history storage table 840 is performed together with newest history numeric value rewriting.

It will be assumed here that the present retransmission request packet has been transmitted by receiving terminal D, and that the reception time was 1439.8050 [sec]. In this case, the elapsed time from the previous receiving terminal D record update time of 1439.0040 [sec] is within 10 seconds. Therefore, receiving terminal relevancy updating section 550 does not perform a history information shift, but only performs newest history numeric value rewriting.

Receiving terminal relevancy updating section 550 first adds a value of "1" to the value of Past History 843$i$ of the history record of receiving terminal D, which is the retransmission request source, in history storage table 840. By this means, the value of Past History 843$i$ of the history record of receiving terminal D is updated to "20", as shown in FIG. 21.

Also, if there is a receiving terminal 300 that has already made a retransmission request for a sequence number identical to the present retransmission request sequence number, receiving terminal relevancy updating section 550 adds "1" to a value in Number of Retransmission Request Receptions History 844 corresponding to an updated value in relevancy storage table 810. It is assumed here that receiving terminals B and E have already made a retransmission request for a sequence number identical to the present retransmission request sequence number. In this case, as shown in FIG. 21, the history Bi and Ei values of receiving terminals B and E in Number of Retransmission Request Receptions History 844 are updated to "20" and "23" respectively in the receiving terminal D history record. Also, as shown in FIG. 21, the history Di value of receiving terminal D in Number of Retransmission Request Receptions History 844 is updated to "21" in the history records of receiving terminals B and E.

Next, receiving terminal relevancy updating section 550 updates records in relevancy storage table 810 corresponding to history records updated in history storage table 840, based on post-updating values in history storage table 840. Specifically, a total of values obtained by multiplying past three histories in history storage table 840 by a weighting coefficient are calculated, and the calculated value is entered in the corresponding part of relevancy storage table 810.

As a result, as shown in FIG. 22, Total Number of Retransmission Request Receptions 814 of the receiving terminal D record in relevancy storage table 810 is updated to 0.6×21+ 0.3×15+0.1×5=17.6 based on the set weighting coefficient and Past History 843 of the receiving terminal D history record. In a similar way, all values of Number of Retransmission Request Receptions 815 of the records of receiving terminals B, D, and E are updated.

Then receiving terminal relevancy updating section 550 enters the current time in Previous Update Time 842 of receiving terminals B, D, and E that are objects of record updating in history storage table 840. Here, it is assumed that 1450.1123 [sec] is entered.

In this way, relevancy storage table 810 is updated in a state in which a greater weight is applied to a temporally newer history.

Next, it will be assumed that a retransmission request specifying a sequence number already received as a retransmission request sequence number from receiving terminals B and E is received from receiving terminal D at time 1450.1123 [sec]. In this case, the elapsed time from the previous update time of 1439.0040 [sec] is approximately 11.1 seconds—that is, greater than or equal to 10 seconds.

Receiving terminal relevancy updating section 550 first calculates a value resulting from discarding the decimal part of a value obtained by dividing the time division by 10 seconds, and shifts the history record contents of a receiving terminal related to the present retransmission request toward the past side by the amount of the calculated value.

Here, since 11.1/10=1.1, as shown in FIG. 23 newest history (i) and next newest history (ii) of receiving terminals B, D, and E related to the present retransmission request in history storage table 840 shown in FIG. 21 are each shifted one place toward the old side. Post-shift processing is the same as when the elapsed time from the previous update is less than 10 seconds.

As a result of this, the records of receiving terminals B, D, and E are all updated in relevancy storage table 810 as shown in FIG. 24.

In this way, weighting of a past retransmission request can be executed precisely. By this means, weight distribution in the time domain can be set more freely. Also, relevance can be calculated using only a new history within a fixed time period, enabling responsivity of network state changes to be further improved.

If it is wished to perform weighting still more precisely, the number of past histories recorded in history storage table 840 can be increased.

Thus, according to this embodiment, in relevancy storage table updating a greater weight can be applied to update contents based on a temporally newer retransmission request. By this means, delivery tree estimation with good responsivity is made possible, and a retransmission packet can be sent at early timing even in an environment in which a delivery tree is updated during communication, or an environment featuring intensive network state changes downstream in a delivery tree.

Weighting of each history may also be changed according to the degree or speed of changes to the state of a delivery tree or network. In this case, a good balance can be achieved between responsivity of delivery tree and network state changes and precision of estimation.

(Embodiment 3)

Embodiment 3 improves responsivity of network state changes by detecting failure of selection of a precedent retransmission packet transmission retransmission destination because an estimated delivery tree differs from an actual delivery tree, and reflecting the result of the failure in a relevancy storage table.

Assume that a sequence number that is not an object of retransmission to a certain receiving terminal and that is a sequence number that is an object of retransmission to another receiving terminal is received from the first-mentioned certain receiving terminal as a retransmission request sequence. In this case, it can be inferred that retransmission destination selection failed in past retransmission processing. A failure of this kind occurs, for example, when a delivery tree or network has changed. Thus, each time a retransmission request is received, a transmitting terminal of this embodiment determines whether or not that retransmission request is due to a failure of past retransmission destination selection, and if it is due to a failure of past retransmission destination selection, prevents an identical failure by making a correction to the relevancy storage table.

Figure 25:
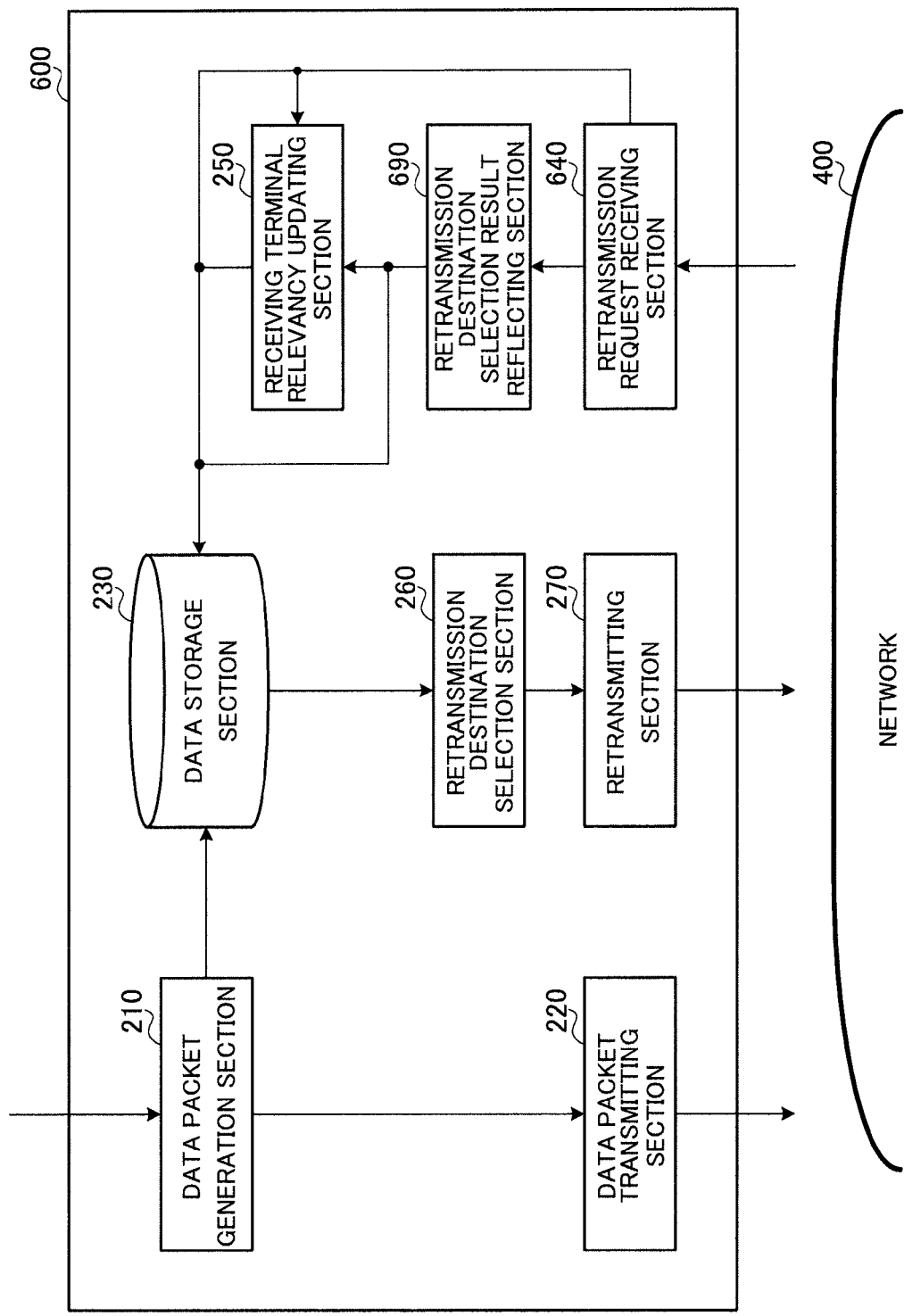
FIG. 25 is a block diagram showing a configuration of a transmitting terminal serving as a data transmitting apparatus according to Embodiment 3 of the present invention.

FIG. 25 is a block diagram showing a configuration of a transmitting terminal serving as a data transmitting apparatus according to Embodiment 3, and corresponds to FIG. 3 of Embodiment 1. Parts in FIG. 25 identical to those in FIG. 3 are assigned the same codes as in FIG. 3, and descriptions thereof are omitted here.

In FIG. 25, transmitting terminal 600 additionally has retransmission destination selection result reflecting section 690, and also has retransmission request receiving section 640 instead of retransmission request receiving section 240 shown in FIG. 3.

Retransmission request receiving section 640 acquires a retransmission request sequence number and retransmission request source information from a received retransmission request packet. Then retransmission request receiving section 640 checks relevancy storage table 810 (see FIG. 4) stored in data storage section 230, and determines whether or not the following condition is satisfied: namely, that the acquired retransmission request sequence number has not been entered in Retransmitted Sequence Number 812 of a record of the retransmission request source and has been entered in Retransmitted Sequence Number 812 of a record of another receiving terminal 300.

If the above condition is not satisfied, retransmission request receiving section 640 outputs the retransmission request sequence number and retransmission request source information to receiving terminal relevancy updating section 250 in the same way as in Embodiment 1. On the other hand, if the above condition is satisfied, retransmission request receiving section 640 assumes that retransmission destination receiving terminal selection has failed, and outputs the retransmission request sequence number and retransmission request source information to retransmission destination selection result reflecting section 690.

Retransmission destination selection result reflecting section 690 makes a correction to the record in relevancy storage table 810 of another receiving terminal 300 to which data of a sequence number identical to the retransmission request sequence number input from retransmission request receiving section 640 has already been retransmitted. Specifically, retransmission destination selection result reflecting section 690 increases the value of the retransmission request source in Number of Retransmission Request Receptions 815 of the record of the above other receiving terminal 300. By this means, when a retransmission request packet is subsequently received from the above other receiving terminal 300, it becomes easy for the above retransmission request source to be selected as a retransmission destination.

The operation of transmitting terminal 600 having the above configuration will now be described. Here, the operation of transmitting terminal 600 when it receives a retransmission request packet will be described using FIG. 26 through FIG. 29.

Figure 26:
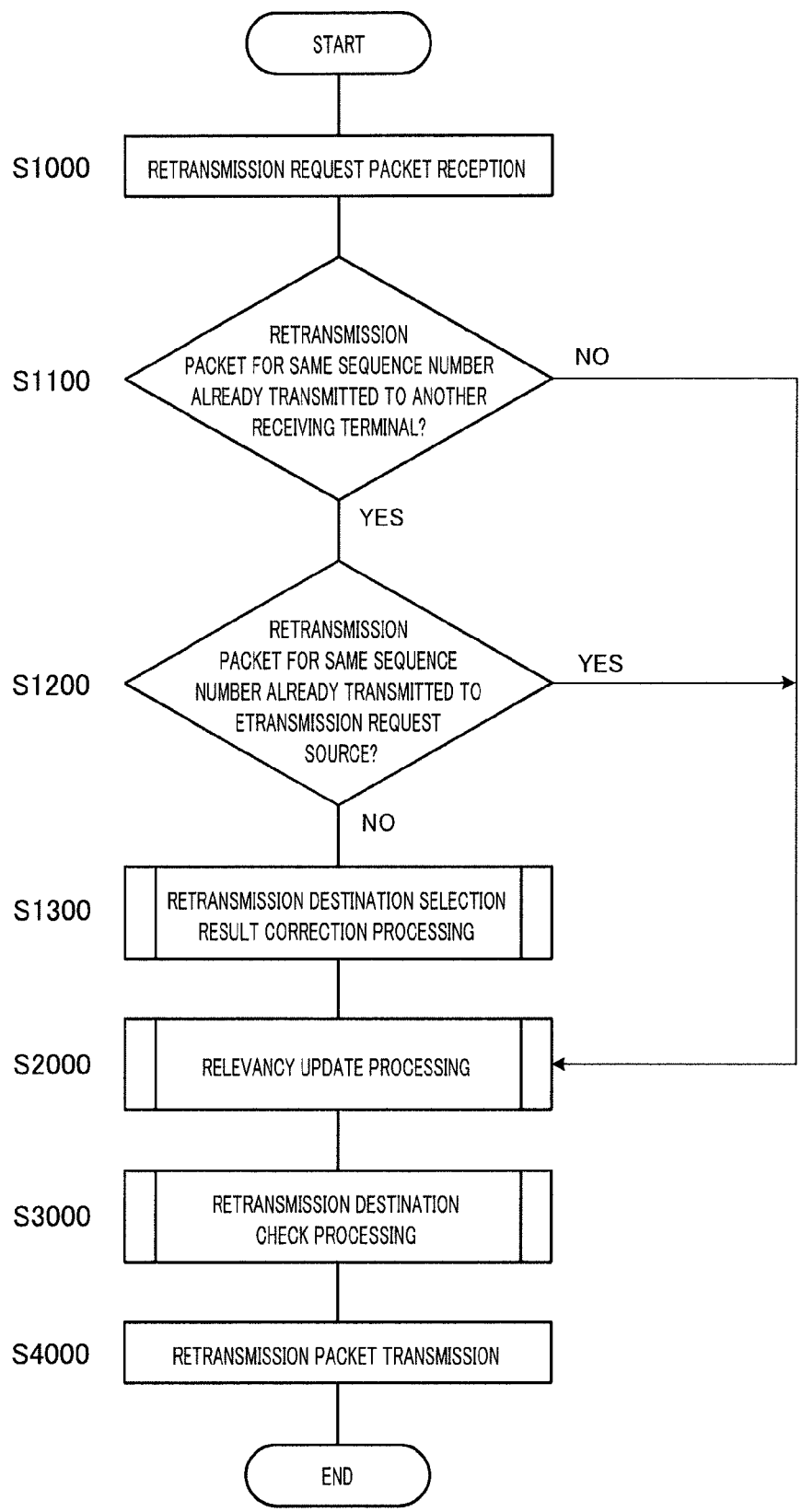
FIG. 26 is a flowchart showing the overall operation flow of a transmitting terminal when it receives a retransmission request packet in Embodiment 3.

FIG. 26 is a flowchart showing the overall operation flow of transmitting terminal 600 when it receives a retransmission request packet, and corresponds to FIG. 6 of Embodiment 1. Parts in FIG. 26 identical to those in FIG. 6 are assigned the same step numbers as in FIG. 6, and descriptions thereof are omitted here.

When a retransmission request packet is received by retransmission request receiving section 640 (step S1000), processing proceeds to step S1100.

In step S1100, retransmission request receiving section 640 determines whether or not a retransmission packet for a sequence number identical to the present retransmission request sequence number has already been transmitted to another receiving terminal 300 other than the retransmission request source. Specifically, retransmission request receiving section 640 searches for a sequence number identical to the retransmission request sequence number in Retransmitted Sequence Number 812 of the record of a receiving terminal 300 other than the retransmission request source in relevancy storage table 810. If a retransmission packet for the same sequence number has not been transmitted to another receiving terminal 300 (S1100: NO), processing proceeds to step S2000. On the other hand, if the same sequence number is present, and a retransmission packet for the same sequence number has already been transmitted to another receiving terminal 300 (S1100: YES), processing proceeds to step S1200.

In step S1200, retransmission request receiving section 640 determines whether or not a retransmission packet for a sequence number identical to the present retransmission request sequence number has already been transmitted to the retransmission request source. Specifically, retransmission request receiving section 640 checks whether or not a sequence number identical to the retransmission request sequence number has been entered in Retransmitted Sequence Number 812 of the record of the retransmission request source in relevancy storage table 810. If a sequence number identical to the retransmission request sequence number has been entered (S1200: YES), it is simply assumed that a packet loss occurred for a retransmission packet transmitted in the past, and processing proceeds to step S2000. On the other hand, if a sequence number identical to the retransmission request sequence number has not been entered (S1200: NO), processing proceeds to step S1300.

In step S1300, retransmission request receiving section 640 outputs the retransmission request sequence number and retransmission request source information to retransmission destination selection result reflecting section 690. When the sequence number and retransmission request source information are input, retransmission destination selection result reflecting section 690 assumes that the retransmission request destination has leaked from retransmission destination selection, and executes retransmission destination selection result correction processing that corrects relevancy storage table 810. Then processing proceeds to step S2000, and thereafter a retransmission packet is transmitted via relevancy update processing and retransmission destination check processing in the same way as in Embodiment 1.

Figure 27:
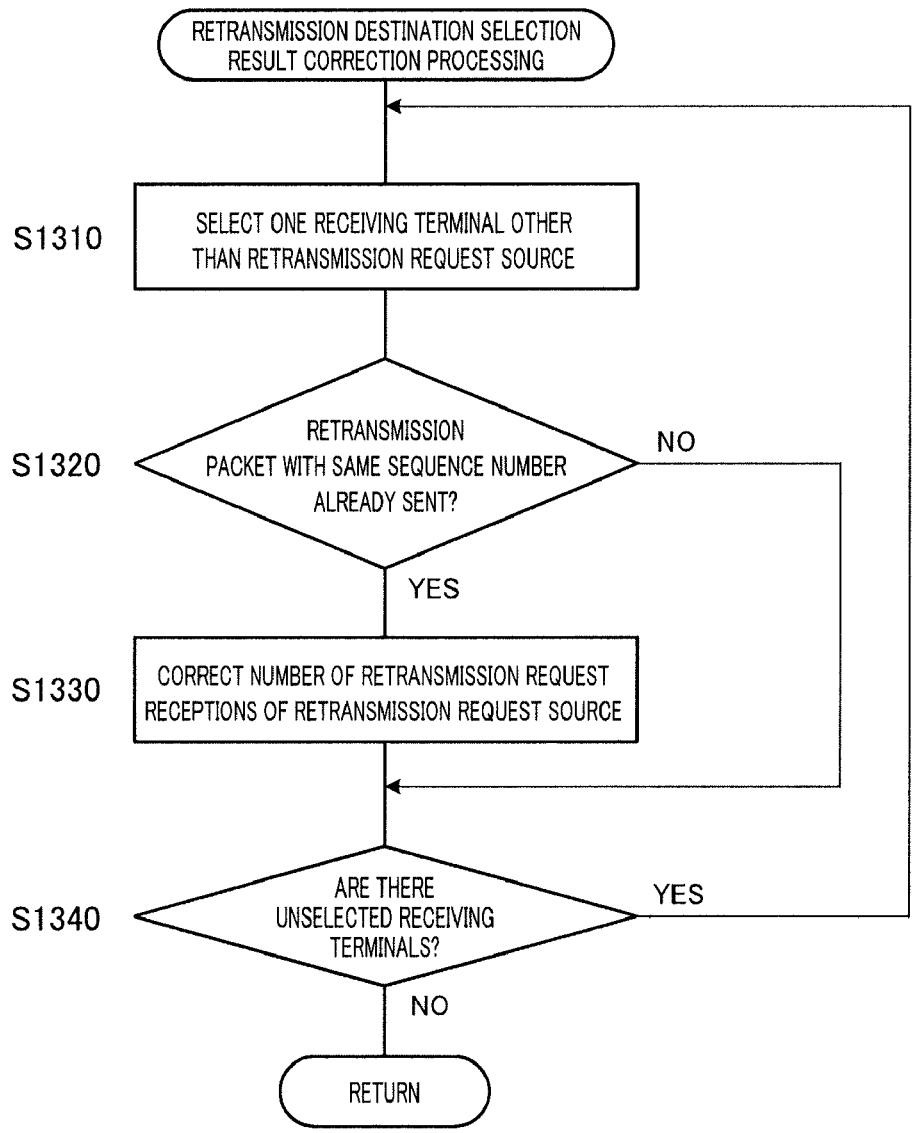
FIG. 27 is a flowchart showing the flow of retransmission destination selection result correction processing in Embodiment 3.

FIG. 27 is a flowchart showing the flow of retransmission destination selection result correction processing (step S1300 in FIG. 26).

In step S1310, retransmission destination selection result reflecting section 690 selects one receiving terminal 300 other than the retransmission request source.

In step S1320, retransmission destination selection result reflecting section 690 checks whether or not a sequence number identical to the retransmission request sequence number has been entered in Retransmission Request Sequence Number 813 of the record of selected receiving terminal 300 in relevancy storage table 810. Retransmission destination selection result reflecting section 690 proceeds to step S1330 if the same sequence number has been entered (S1320: YES), or proceeds to step S1340 if the same sequence number has not been entered (S1320: NO).

In step S1330, retransmission destination selection result reflecting section 690 increases the value of the retransmission request source in Number of Retransmission Request Receptions 815 of the record of selected receiving terminal 300. Also, if the post-correction number of retransmission request receptions exceeds Total Number of Retransmission Request Receptions 814 of the record of selected receiving terminal 300, retransmission destination selection result reflecting section 690 determines that the correction is too large, and changes the relevant number of retransmission request receptions to a value identical to that of Total Number of Retransmission Request Receptions 814. Equation (7) below, for example, can be used to increase the retransmission request source value.

$$\text{Number of retransmission request receptions=current number of retransmission request receptions} \times 1.1 \quad (7)$$

When Equation (7) is used, the number of retransmission request receptions of the retransmission request source in the record of selected receiving terminal 300 is multiplied by 1.1. By this means, when a retransmission request is received from selected receiving terminal 300, it becomes easy for the present retransmission request source to be selected as a precedent retransmission packet transmission destination.

If the 1.1 value in Equation (7) is made larger, the retransmission request source can be selected more easily, and can be selected as a retransmission destination in a shorter time. Conversely, if the 1.1 value in Equation (7) is made smaller, the effect of a correction by retransmission destination selection result reflecting section 690 can be reduced. Also, an increase in the value of the number of retransmission request receptions may be performed by simply adding a fixed value to the current number of retransmission request receptions, or may be performed by deciding an amount of increase based on the difference from the total number of retransmission request receptions of receiving terminal 300.

Then, in step S1340, retransmission destination selection result reflecting section 690 determines whether or not there are unselected receiving terminals 300. If there are unselected receiving terminals 300 (S1340: YES), retransmission destination selection result reflecting section 690 returns to step S1310, selects one unselected receiving terminal 300, and repeats the processing. If processing has been completed for all receiving terminals 300 (S1340: NO), retransmission destination selection result reflecting section 690 terminates the series of processing steps and returns to the processing shown in FIG. 26.

Thus, as a result of retransmission destination selection result correction processing by retransmission destination selection result reflecting section 690, relevancy storage table 810 is corrected in a way that reflects a retransmission destination selection failure and in a direction that brings it closer to the current state of the delivery tree. Then step S2000 relevancy update processing is performed on post-correction relevancy storage table 810.

The way in which relevancy storage table 810 contents are changed by the above processing will now be described.

FIG. 28 is a drawing showing an example of the contents of relevancy storage table 810 at a certain point in time, and FIG. 29 is a drawing showing how the contents of relevancy storage table 810 change when retransmission destination selection result correction processing is performed on relevancy storage table 810 shown in FIG. 28.

In relevancy storage table 810 shown in FIG. 28, sequence number "10" is entered in Retransmitted Sequence Number 812 only in the records of receiving terminals B and E. It will be assumed that a retransmission request packet specifying sequence number "10" is received from receiving terminal D while relevancy storage table 810 is in this state.

Since sequence number "10" is entered in Retransmitted Sequence Number 812 of the records of receiving terminals B and E, and sequence number "10" is not entered in Retransmitted Sequence Number 812 of the record of receiving terminal D, which is the retransmission request source, processing is passed to retransmission destination selection result reflecting section 690.

Then the receiving terminal D values in Number of Retransmission Request Receptions 815 of the records of receiving terminals B and E are updated in an increasing direction. When Equation (7) is used, the receiving terminal D value in Number of Retransmission Request Receptions 815 of the receiving terminal B record is updated to 20×1.1=22 as shown in FIG. 29, and the receiving terminal D value in Number of Retransmission Request Receptions 815 of the receiving terminal E record is updated to 23×1.1=25.3 as shown in FIG. 29.

Thus, according to this embodiment, when a retransmission request packet arrives from a receiving terminal 300 that has not been selected as a retransmission destination in past retransmission packet transmission, relevancy storage table 810 is corrected so that precedent retransmission is facilitated. By this means, changes in the state of a delivery tree or network can be tracked promptly and the relevancy storage table corrected accordingly, and short-delay retransmission control can be implemented more dependably.

In the above-described embodiments, a transmitting terminal that performs packet distribution by means of an explicit multicast method has been described, but the present invention is not limited to this, and can be applied to data transmitting apparatuses of various kinds, including a data transmitting apparatus using an overlay multicast method. To be more specific, it is possible for the present invention to be applied to a data transmitting apparatus that receives data retransmission requests from a plurality of data receiving apparatuses.

The disclosure of Japanese Patent Application No. 2007-182669, filed on Jul. 11, 2007, including the specification, drawings and abstract, is incorporated herein by reference in its entirety.

INDUSTRIAL APPLICABILITY

A data transmitting apparatus and data retransmitting method according to the present invention are suitable for use as a data transmitting apparatus and data retransmitting method that enable a retransmission packet to be transmitted at early timing even if the structure of a delivery tree is unknown. According to this data transmitting apparatus and data retransmitting method, it is possible for the received video quality of a receiving terminal to be improved by receiving a retransmission packet for recovering from a packet loss by a playback time even in short-delay real-time communication. Therefore, this data transmitting apparatus and data retransmitting method are suitable for use in a teleconferencing system or network gaming, for example. Also, according to this data transmitting apparatus and data retransmitting method, there is no dependence on functions of apparatuses on a route to a packet receiving apparatus or relevancy between apparatuses. Therefore, a data transmitting apparatus and data retransmitting method according to the present invention are particularly suitable for use in multicast communication in an existing network or multicast communication for a small group.

The invention claimed is:

1. A data transmitting apparatus comprising:
a retransmission request receiver that receives a data retransmission request for data;
a relevancy updater that stores a past history of a number of receptions of a retransmission request sent from a first data receiving and a past history of a number of receptions of a retransmission request sent from another data receiving apparatus for which an object is identical to an object of a retransmission request sent from the first data receiving apparatus; and
a retransmission destination selector that estimates a delivery tree from the stored past histories in the relevancy updater on receiving a retransmission request from the first data receiving apparatus, and selects, the another data receiving apparatus located downstream of the first data receiving apparatus in the estimated delivery tree as a retransmission destination of the data.

2. The data transmitting apparatus according to claim 1, wherein the retransmission request receiver extracts, from the received retransmission request, information indicating an object of that retransmission request and information indicating a data receiving apparatus that is a transmission source of that retransmission request.

3. The data transmitting apparatus according to claim 2, further comprising:
a data packet transmitter that transmits a data packet that stores data that is an object of distribution to a group to which the first data receiving apparatus belongs, and to which a sequence number is assigned, to the group by multicast communication; and
a data storage that stores a data packet transmitted to the group by multicast communication,
wherein the retransmission destination selector, when information indicating an object of a retransmission request received from the first data receiving apparatus is the sequence number, acquires data stored in a relevant data packet from the data storage, and makes acquired data an object of retransmission.

4. The data transmitting apparatus according to claim 3, wherein the retransmission destination selection section selector stores data acquired from the data storage, and generates a retransmission packet with a data receiving apparatus selected as the retransmission destination as a destination, and
further comprising a retransmitter that transmits a retransmission packet generated by the retransmission destination selector to a destination of that retransmission packet.

5. The data transmitting apparatus according to claim 1, wherein:
the relevancy updater creates a relevancy storage table in which information indicating an object of a received retransmission request is entered in association with information indicating a data receiving apparatus that is a transmission source of that retransmission request; and
the retransmission destination selector references the relevancy storage table and estimates the delivery tree.

6. The data transmitting apparatus according to claim 5, wherein:
the relevancy storage table further has entered therein a total number of receptions of a retransmission request sent from the first data receiving apparatus and a number of receptions of a retransmission request sent from another data receiving apparatus for which an object is identical to an object of a retransmission request received from the first data receiving apparatus; and
the relevancy updater references the relevancy storage table and determines whether or not a retransmission request for which an object is identical to an object of a retransmission request received from the first data receiving apparatus has been received from another data receiving apparatus, and updates the relevancy storage table based on a result of the determination.

7. The data transmitting apparatus according to claim 6, wherein the retransmission destination selector calculates a value obtained by dividing a number of receptions of a retransmission request sent from another data receiving apparatus for which an object is identical to an object of a retransmission request sent from the first data receiving apparatus by a total number of receptions of a retransmission request sent from the first data receiving apparatus as relevance, and when the relevance is higher than a predetermined threshold value, determines that the other data receiving apparatus is located downstream of the first data receiving apparatus.

8. The data transmitting apparatus according to claim 5, further comprising a retransmission destination selection result reflector that, when an object of a retransmission request received from another data receiving apparatus other than the first data receiving apparatus has not been transmitted to the other data receiving apparatus and has been transmitted to the first data receiving apparatus, increases a value of a number of receptions of a retransmission request sent from the other data receiving apparatus for which an object is identical to an object of a retransmission request sent from the first data receiving apparatus among values entered in the relevancy storage table.

9. The data transmitting apparatus according to claim 8, wherein:
the relevancy storage table has entered therein information indicating data transmitted in response to a retransmission request in association with information indicating a data receiving apparatus; and the retransmission destination selection result reflector references the relevancy storage table and determines whether or not an object of a retransmission request received from another data receiving apparatus other than the first data receiving apparatus has not been transmitted to the other data receiving apparatus and has been transmitted to the first data receiving apparatus.

10. The data transmitting apparatus according to claim 6, wherein the relevancy updater, in updating the total number of receptions of a retransmission request and the number of receptions of a retransmission request of the relevancy storage table, performs weighing in the time domain.

11. The data transmitting apparatus according to claim 10, wherein the relevancy updater performs greater weighting for a difference of a temporally newer update among pre- and post-updating differences of the relevancy storage table.

12. A data retransmitting method comprising:
receiving a data retransmission request from a first data receiving apparatus;
estimating a delivery tree from a past history of a number of receptions of a retransmission request sent from the first data receiving apparatus and a past history of a number of receptions of a retransmission request sent from another data receiving apparatus for which an object is identical to an object of a retransmission request sent from the first data receiving apparatus, and selecting, the another data receiving apparatus located downstream of the first data receiving apparatus in the estimated delivery tree as a retransmission destination of the data; and
transmitting the data to a data receiving apparatus selected as a retransmission destination in the selecting.

* * * * *